United States Patent
Urdaneta

(10) Patent No.: US 10,745,993 B2
(45) Date of Patent: Aug. 18, 2020

(54) AUTOMATED OPERATION OF WELLSITE EQUIPMENT

(71) Applicant: SCHLUMBERGER TECHNOLOGY CORPORATION, Sugar Land, TX (US)

(72) Inventor: Carlos Urdaneta, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 283 days.

(21) Appl. No.: 15/563,682

(22) PCT Filed: Mar. 24, 2016

(86) PCT No.: PCT/US2016/023857
§ 371 (c)(1),
(2) Date: Oct. 2, 2017

(87) PCT Pub. No.: WO2016/160459
PCT Pub. Date: Oct. 6, 2016

(65) Prior Publication Data
US 2018/0258736 A1  Sep. 13, 2018

Related U.S. Application Data

(60) Provisional application No. 62/139,963, filed on Mar. 30, 2015.

(51) Int. Cl.
*G06F 11/30* (2006.01)
*E21B 33/14* (2006.01)
(Continued)

(52) U.S. Cl.
CPC .............. *E21B 33/14* (2013.01); *E21B 33/13* (2013.01); *E21B 47/0005* (2013.01); *G05B 19/02* (2013.01); *G05B 19/409* (2013.01)

(58) Field of Classification Search
CPC ....................................................... E21B 33/14
See application file for complete search history.

(56) References Cited

U.S. PATENT DOCUMENTS

| 3,705,626 A | 12/1972 | Glenn, Jr. |
| 5,006,044 A | 4/1991 | Walker, Sr. et al. |
| (Continued) | | |

FOREIGN PATENT DOCUMENTS

WO  9708459 A1  3/1997

OTHER PUBLICATIONS

International Search Report and Written Opinion issued in International Patent Appl. No. PCT/US2016/023856 dated Jun. 27, 2016; 21 pages.

(Continued)

*Primary Examiner* — Phuong Huynh
(74) *Attorney, Agent, or Firm* — Cathy Hewitt

(57) ABSTRACT

Systems and methods for controlling wellsite equipment, including a cementing unit comprising a plurality of sensors operable to generate information related to operational status of the cementing unit and a controller comprising a processor and a memory including computer program code. Communication is established between the cementing unit and the controller. The controller is operable to operate the cementing unit to automatically perform: a pressure calibration of the cementing unit, a pressure test of the cementing unit, an over pressure shut-down test of the cementing unit, a low rate pumping test of the cementing unit, a hydraulic horsepower test of the cementing unit, and/or a mixing test of the cementing unit.

20 Claims, 11 Drawing Sheets

(51) Int. Cl.
*G05B 19/02* (2006.01)
*E21B 33/13* (2006.01)
*E21B 47/00* (2012.01)
*G05B 19/409* (2006.01)

(56) References Cited

U.S. PATENT DOCUMENTS

| | | |
|---|---|---|
| 5,289,877 A | 3/1994 | Naegele et al. |
| 2003/0196798 A1 | 10/2003 | Newman |
| 2004/0120804 A1 | 6/2004 | Sabini et al. |
| 2009/0068031 A1 | 3/2009 | Gambier et al. |
| 2011/0046903 A1 | 2/2011 | Franklin |
| 2012/0301320 A1 | 11/2012 | Seitter |
| 2013/0233165 A1* | 9/2013 | Matzner .............. F04B 51/00 91/1 |
| 2013/0290064 A1* | 10/2013 | Altamirano ...... G06Q 10/06316 705/7.26 |
| 2017/0082101 A1 | 3/2017 | Urdaneta et al. |
| 2017/0211569 A1 | 7/2017 | Urdaneta et al. |
| 2018/0003171 A1 | 1/2018 | Rashid et al. |
| 2018/0073346 A1 | 3/2018 | Urdaneta |

OTHER PUBLICATIONS

International Search Report and Written Opinion issued in International Patent Appl. No. PCT/US2016/023857 dated Oct. 7, 2016; 18 pages.

\* cited by examiner

AUTOMATED OPERATION OF WELLSITE EQUIPMENT

CROSS-REFERENCE TO RELATED APPLICATIONS

This application claims priority to and the benefit of U.S. Provisional Application No. 62/139,963, titled "WELL CEMENTING METHODS," filed Mar. 30, 2015, the entire disclosure of which is hereby incorporated herein by reference.

BACKGROUND OF THE DISCLOSURE

High-volume, high-pressure pumps are utilized at wellsites for a variety of pumping operations. Such operations may include drilling, cementing, acidizing, water jet cutting, hydraulic fracturing, and other wellsite operations. In some pumping operations, several pumps may be fluidly connected to a well via various fluid conduits and/or a manifold. During such operations, the fluid conduits and/or the manifold distributes low-pressure fluid from a mixer, a blender, and/or other sources among the pumps and combines pressurized fluid from the pumps for injection into the well. The fluid conduits and/or the manifold may have a large physical size and weight to satisfy intended fluid flow rates and operating pressures generated by the pumps.

Success of the pumping operations at a wellsite may be affected by many factors, including efficiency, failure rates, and safety related to operation of the pumps and the manifold. High fluid pressures, flow rates, and vibrations generated by the pumps may cause mechanical fatigue, wear, and other damage to the pumps and various downstream equipment, including the manifold and associated fluid sensors, valves, couplings, and conduits. Mechanical fatigue and wear may cause leaks and/or other failures in the pumps and the various downstream equipment.

To ensure that the wellsite equipment operates as intended, human operators at the wellsite may perform pressure and flow rate calibrations, diagnostics, and other tests before commencing actual downhole pumping operations. To perform such tests and to oversee the actual downhole pumping operations, the operators typically approach the wellsite equipment to visually inspect the fluid sensors and to manually adjust the fluid valves, thus exposing themselves to a potentially dangerous environment. Approaching wellsite equipment during testing or pumping operations may be dangerous, such as because high-pressure fluid within such equipment may escape, which may lead to serious injuries. Also, performing the testing and pumping operations manually may result in inconsistent equipment settings and, thus, inconsistent performance between different operational stages or jobs caused by human error.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method that includes establishing communication between a cementing unit and a controller operable to control operation of the cementing unit. The controller includes a processor and a memory including computer program code. The method also includes inputting a pressure set-point and operating the controller to automatically perform a pressure calibration of the cementing unit. The pressure calibration includes automatically: varying a pumping speed of a pump unit of the cementing unit to increase a fluid pressure generated by the pump unit to the pressure set-point while recording the varying pumping speeds and corresponding fluid pressures; and determining a pressure ramp relating the recorded pumping speeds and corresponding fluid pressures.

The present disclosure also introduces a method that includes establishing communication between a cementing unit and a controller operable to control operation of the cementing unit. The controller includes a processor and a memory including computer program code. The method also includes inputting a pressure set-point and a test duration set-point, and operating the controller to automatically perform a pressure test of the cementing unit. The pressure test includes automatically: varying a pumping speed of a pump unit of the cementing unit to increase a fluid pressure generated by the pump unit to the pressure set-point while recording the varying pumping speeds and corresponding first fluid pressures, the recorded first fluid pressures being detected within a fluid conduit of the cementing unit downstream of the pump unit; and recording second fluid pressures within the fluid conduit until the test duration set-point is met while confirming that the recorded second fluid pressures are within a predetermined range of the pressure set-point.

The present disclosure also introduces a method that includes establishing communication between a cementing unit and a controller operable to control operation of the cementing unit. The controller includes a processor and a memory including computer program code. The method also includes inputting a pumping speed set-point and a pressure set-point, and operating the controller to automatically perform an over-pressure shut-down test of the cementing unit. The over-pressure shut-down test includes automatically: while a choke valve of the cementing unit downstream of a pump unit of the cementing unit is at least partially open, progressively increasing a pumping speed of the pump unit while recording the varying pumping speeds and corresponding first fluid pressures until one of the recorded pumping speeds substantially equals the pumping speed set-point; then (2) progressively closing the choke valve while recording positions of the choke valve and corresponding second fluid pressures at least until the pump unit automatically stops pumping in response to over-pressurization; and then (3) confirming that one of the recorded second fluid pressures associated with the automatic pump unit stoppage is within a predetermined range of the pressure set-point.

The present disclosure also introduces a method that includes establishing communication between a cementing unit and a controller operable to control operation of the cementing unit. The controller includes a processor and a memory including computer program code. The method also includes inputting a first pumping speed set-point, a second pumping speed set-point, and a flow rate set-point. The second pumping speed set-point is at least 10% of the first pumping speed set-point. The method also includes operating the controller to automatically perform a low rate pumping test of the cementing unit. The low rate pumping test includes automatically: progressively increasing pumping speed of a pump unit of the cementing unit while recording first pumping speeds and corresponding first fluid flow rates generated by the pump unit until one of the recorded first pumping speeds substantially equals the first pumping speed set-point; progressively decreasing the pumping speed from the first pumping speed set-point while recording second pumping speeds and corresponding second fluid flow rates until one of the recorded second pumping speeds substantially equals the second pumping speed set-point; and confirming that one of the recorded second fluid flow rates corresponding to the one of the recorded second pumping speeds is within a predetermined range of the flow rate set-point.

The present disclosure also introduces a method that includes establishing communication between a cementing unit and a controller operable to control operation of the cementing unit. The controller includes a processor and a memory including computer program code, and the cementing unit includes sensors operable to generate information indicative of operational parameters of the cementing unit. The method also includes inputting operational set-points of the cementing unit, and operating the controller to automatically perform a mixing test of the cementing unit. The mixing test includes automatically performing a mixing operation while confirming that the sensed operational parameters are substantially equal to corresponding: actual values corresponding to the operational parameters; and operational set-points.

The present disclosure also introduces a method that includes establishing communication between a cementing unit and a controller operable to control operation of the cementing unit. The controller includes a processor and a memory including computer program code. The method also includes inputting a torque output set-point, a horsepower set-point, and a pumping speed set-point, and operating the controller to automatically perform a hydraulic horsepower test of the cementing unit. The hydraulic horsepower test includes automatically: (1) operating a pump unit of the cementing unit at the torque output set-point to increase pumping speed of the pump unit while recording first pumping speeds and corresponding first fluid pressures and first fluid flow rates generated by the pump unit until one of the recorded first pumping speeds substantially equals the pumping speed set-point; and then (2) progressively closing a choke valve of the cementing unit downstream of the pump unit to increase the fluid pressure generated by the pump unit while recording: (a) second pumping speeds and corresponding second fluid pressures and second fluid flow rates; and (b) hydraulic horsepower values of the pump unit based on the recorded second fluid pressures and second fluid flow rates. Closing the choke valve is performed until: (i) one of the recorded hydraulic horsepower values substantially equals the horsepower set-point; or (ii) one of the recorded second pumping speeds is less than the pumping speed set-point by a predetermined amount.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
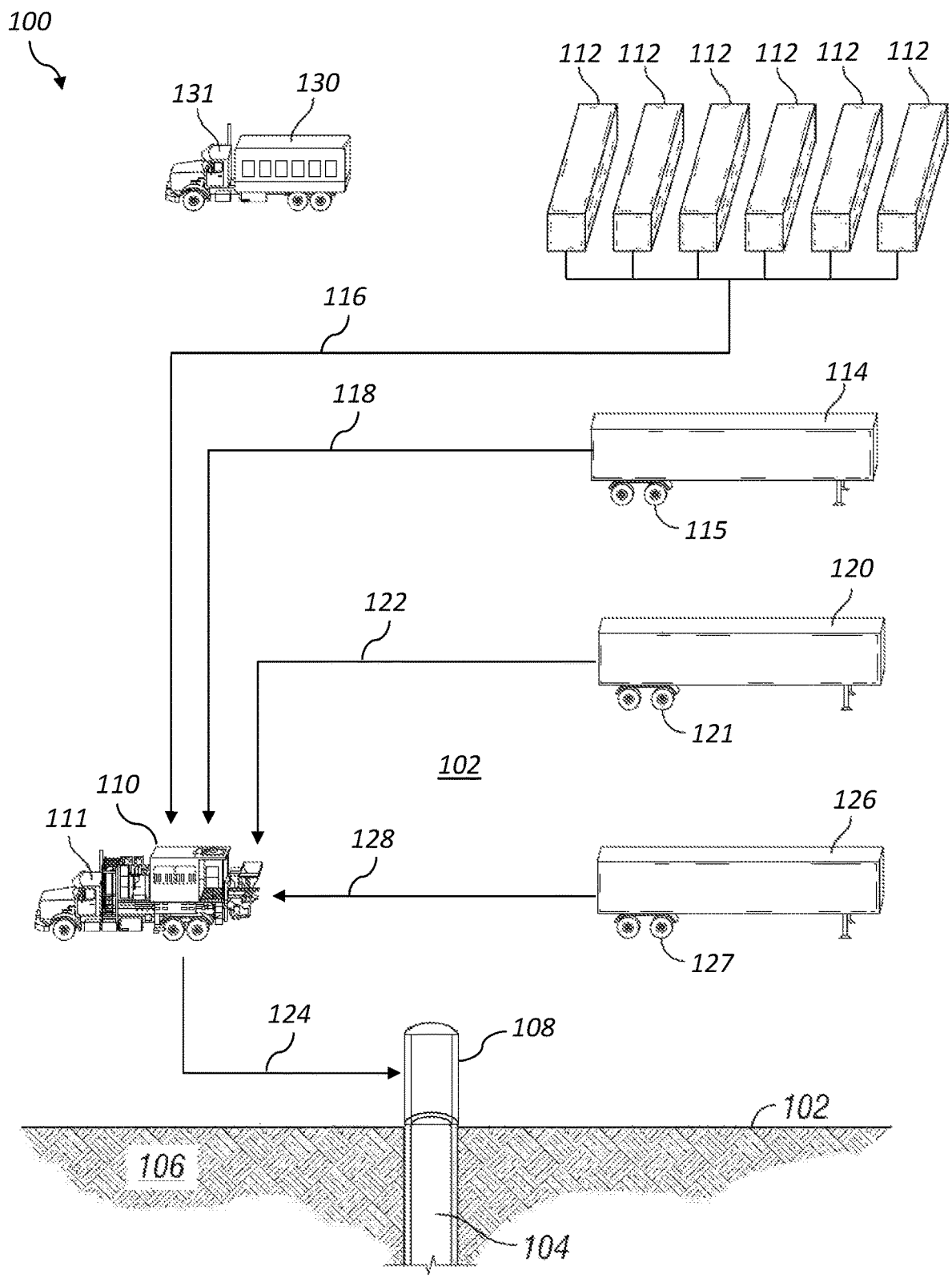
FIG. 1 is a schematic view of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of an example wellsite system 100 according to one or more aspects of the present disclosure. The figure depicts the wellsite system 100 located on a wellsite 102 adjacent a wellbore 104 and a partial sectional view of the subterranean formation 106 penetrated by the wellbore 104 below the wellsite 102. The wellbore 104 may terminate with a wellhead 108 at the wellsite 102. The wellsite system 100 may be operable to transfer various materials and additives from corresponding sources to a destination location for blending or mixing and eventual injection into the wellbore 104 during wellbore cementing operations.

The wellsite system 100 may comprise a cement mixing and pumping unit 110 (referred to hereinafter as a "cementing unit") fluidly connected with one or more tanks 112 and an additive container 114. The tanks 112 may contain that which is known in the art as a base fluid, which may be or comprise fresh water, brine, and/or mud. The container 114 may contain liquid or solid chemicals or additives operable to treat the base fluid. The additives may be or comprise accelerators, retarders, fluid-loss additives, dispersants, extenders, weighting agents, lost circulation additives, among other examples. The cementing unit 110 may be operable to receive the base fluid and one or more of the additives via fluid conduits 116, 118, and mix or otherwise combine the base fluid and the additives to form that which is known in the art as a mixed fluid.

The wellsite system 100 may further comprise a bulk container 120, which may contain a bulk material that is substantially different than the additives contained within the additive container 114. For example, the bulk material may be or comprise a cement powder or bulk cement, among other examples. The cementing unit 110 may be operable to receive the bulk cement from the bulk container 120 via a conduit 122, and mix or otherwise combine the mixed fluid and the bulk cement to form a mixture, which may be or comprise that which is known in the art as a cement slurry. The cementing unit 110 may then discharge or pump the cement slurry into the wellbore 104 via one or more fluid conduits 124 and/or the wellhead 108. The one or more fluid conduits 124 may be or comprise at least a portion of that which is known in the art as a treating line.

The wellsite system 100 may further comprise a batch mixer 126 operable to receive and mix predetermined quantities of the base fluid, additives, and/or bulk cement to form predetermined quantities or batches of the mixed fluid and/or cement slurry. If utilized to store the mixed fluid, the mixed fluid may be communicated to the cementing unit 110 via a fluid conduit 128 to be mixed with the bulk cement to form the cement slurry. If utilized to store the cement slurry, the cement slurry may be communicated to the cementing unit 110 via the fluid conduit 128 and pumped by the cementing unit 110 into the wellbore 104 via the fluid conduit 124 and/or the wellhead 108.

The wellsite system 100 may also comprise a control/power center 130, such as may be operable to provide control and/or centralized electric power distribution to one or more pieces of wellsite equipment or portions of the wellsite system 100. The control/power center 130 may be operable to monitor and control at least a portion of the wellsite system 100 during cementing operations. For example, the control/power center 130 may be operable to monitor and control one or more portions of the cementing unit 110 as well as pumps and/or conveyers (not shown) for moving the fluids, materials, and/or mixtures described above to the cementing unit 110. The control/power center 130 may comprise an engine-generator set, such as a gas turbine generator, an internal combustion engine generator, and/or other sources of electric power. Electric power and/or control signals may be communicated between the control/power center 130 and other wellsite equipment via electric conductors (not shown). However, other means of signal communication, such as wireless communication, are also within the scope of the present disclosure.

The cementing unit 110, the additive container 114, the bulk container 120, the batch mixer 126, and/or the control/power center 130 may each be disposed on corresponding trucks, trailers, and/or other mobile carriers 111, 115, 121, 127, 131, respectively, such as may permit their transportation to the wellsite 102. However, the cementing unit 110, the additive container 114, the bulk container 120, the batch mixer 126, and/or the control/power center 130 may be skidded or otherwise stationary, and/or may be temporarily or permanently installed at the wellsite 102.

FIG. 1 depicts the wellsite system 100 as being operable to form fluids and/or mixtures that may be pressurized and individually or collectively injected into the wellbore 104 during wellbore cementing operations. However, it is to be understood that the wellsite system 100 may be operable to mix and/or produce other mixtures and/or fluids that may be mixed by the cementing unit 110 and injected into the wellbore 104 during other oilfield operations, such as drilling, hydraulic fracturing, acidizing, chemical injecting, and/or water jet cutting operations, among other examples.

Figure 2:
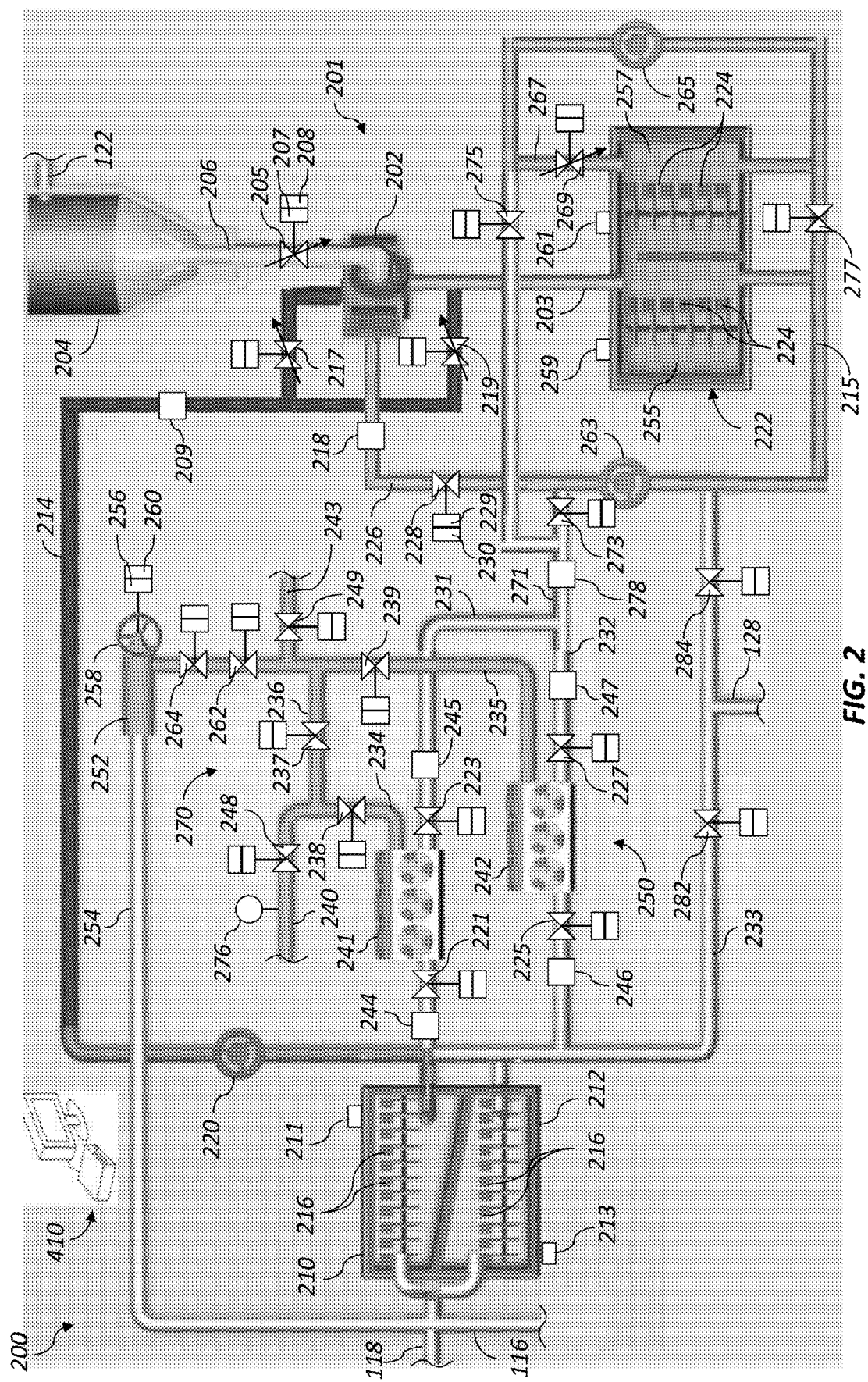
FIG. 2 is a schematic view of a portion of an example implementation of the apparatus shown in FIG. 1 according to one or more aspects of the present disclosure.

FIG. 2 is a schematic view of at least a portion of an example implementation of the cementing unit 110 shown in FIG. 1 according to one or more aspects of the present disclosure, and designated in FIG. 2 by reference numeral 200. The cementing unit 200 may be utilized in various implementations of a wellsite system. However, for the sake of clarity and ease of understanding, the cementing unit 200 is described below in the context of the wellsite system 100 shown in FIG. 1. Thus, the following description refers to FIGS. 1 and 2, collectively.

The cementing unit 200 may comprise a mixing portion 201, having a solid/liquid mixer 202 operable to receive and mix or otherwise combine a dry material and a liquid, such as the bulk cement and the mixed fluid. The mixer 202 may be a vortex type mixer or another mixer operable to mix or blend liquids and solids. The mixer 202 may also be or comprise an eductor, a mixing valve, an inline mixer, or simply a tee or wye joint. The mixer 202 may be or comprise that which is known in the art as a slurry chief. In an example implementation, the mixer 202 may receive the bulk cement from a container 204, which may temporarily store and/or direct the bulk cement received from the bulk container 120 via the conduit 122. The bulk cement may be transferred to the mixer 202 via a material transfer conduit 206. A volumetric or mass dry metering device 205 operable to control the volumetric or mass flow rate of the bulk cement into the mixer 202 may be disposed in association with the container 204 or otherwise along the material transfer conduit 206. The metering device 205 may include a proportional valve, such as a knife gate valve, a butterfly valve, a globe valve, or another valve operable to progressively or gradually open and close. The metering device 205 may also be or comprise a feeder device, such as a metering feeder, a screw feeder, an auger, and/or conveyor, among other examples.

When implemented as a proportional valve, the metering device 205 may be remotely progressively opened and closed by a corresponding actuator 207 operatively coupled with the metering device 205. The actuator 207 may be or comprise an electric actuator, such as a solenoid or motor, or a fluid actuator, such as a pneumatic or hydraulic cylinder or rotary actuator. The metering device 205 may also be actuated manually, such as by a lever (not shown).

The metering device 205 may also include a corresponding position sensor 208 operable to generate a signal or information indicative of an actual position of the metering device, such as to monitor in-real time the actual position of the metering device 205. The actual positions of the metering device 205 may include a fully-open flow position, a fully-closed flow position, and intermediate or incremental positions between the fully-open flow position and the fully-closed flow positions. Each intermediate position may be indicative of an amount or percentage that the metering device 205 is open and, thus, indicative of the flow rate through the metering device 205. The position sensor 208 may be disposed in association with the metering device 205 in a manner permitting sensing of the actual position of the metering device 205. For example, the position sensor 208 may monitor position, orientation, and/or rotation of a material-blocking portion of the metering device 205 or another moving portion of the metering device 205, such as a rotating shaft or stem. The position sensor 208 may be coupled with or disposed adjacent the metering device 205, or the position sensor 208 may be incorporated as a part of the metering device 205. The position sensor 208 may be or comprise a proximity sensor, such as a capacitive sensor, an inductive sensor, a magnetic sensor, a Hall effect sensor, and/or a reed switch, among other examples. The position sensor 208 may also or instead include a linear position sensor, such as a linear potentiometer. The position sensor 208 may also or instead include a rotary position sensor, such as an encoder, a rotary potentiometer, a synchro, a resolver, and/or a rotary variable differential transformer (RVDT), among other examples.

The mixer 202 may also receive the liquid, such as the mixed fluid from displacement tanks 210, 212 via a fluid conduit 214. Each of the displacement tanks 210, 212 may receive the additives from the additive container 114 via the conduit 118 and the base fluid from the tanks 112 via the conduit 116. Within each of the displacement tanks 210, 212 a plurality of mixing blades or other agitators 216 may agitate the mixture to uniformly blend the additives with the base fluid. Each of the displacement tanks 210, 212 may be or comprise a continuous flow channel or pathway for communicating or conveying the additives and the base fluid over a period of time sufficient to permit adequate blending to occur. Each displacement tank 210, 212 may have a first-in-first-out (FIFO) mode of operation, and may comprise a vessel-type outer housing enclosing a receptacle having an elongated flow pathway or space operable to store and communicate the contents therethrough. Metering systems (not shown), such as metering pumps and/or metering valves, may control the flow rate at which the additives and the base fluid are introduced into the displacement tanks 210, 212.

Fluid level sensors 211, 213 may be connected or otherwise disposed in association with each of the displacement tanks 210, 212. Each level sensor 211, 213 may be operable to generate signals or information indicative of the amount of base fluid, mixed fluid, or another fluid contained within a corresponding displacement tank 210, 212. The fluid level sensors 211, 213 may each comprise conductive, capacitive, vibrating, electromechanical, ultrasonic, microwave, nucleonic, and/or other level detection means, as well as load cells and/or other types of level sensors.

The mixing portion 201 of the cementing unit 200 may also include one or more devices operable to pump and/or meter the base fluid or mixed fluid from the displacement tanks 210, 212 to the mixer 202 via the fluid conduit 214. For example, the mixing portion 201 may include a pump unit 220 operable to pump the mixed fluid from the displacement tanks 210, 212 to the mixer 202. The pump unit 220 may be a metering pump, such as may be operable to control the flow rate at which the base fluid or mixed fluid is introduced into the mixer 202. The pump unit 220 may also be a centrifugal or another type of fluid pump. A flow rate sensor 209 may be disposed along the fluid conduit 214 in a manner permitting monitoring of a fluid flow rate of the fluid flowing through the fluid conduit 214. The flow sensor 209 may be or comprise a flow meter operable to measure the volumetric and/or mass flow rate of the fluid and may be operable to generate signals or information indicative of the flow rate of the fluid introduced into the mixer 202.

A first portion of the fluid flowing through the fluid conduit 214 may be introduced into the mixer 202 to be combined with the solid material in the container 204, while a second portion of the fluid flowing through the fluid conduit 214 may be introduced downstream from and, thus, bypassing the mixer 202. The second portion of the fluid may be introduced into a fluid conduit 203 extending between the mixer 202 and a fluid tank 222 of the mixing portion 201. A flow rate control valve 217 may control a flow rate at which the first portion of the fluid is introduced into the mixer 202, while a flow rate control valve 219 may control a flow rate at which the second portion of the fluid is introduced into the fluid tank 222. The flow rate control valves 217, 219 may each be or comprise a needle valve, a metering valve, a butterfly valve, a globe valve, or another valve operable to progressively or gradually open and close to control rate of fluid flow.

The flow rate control valves 217, 219 may be remotely progressively opened and closed by corresponding actuators operatively coupled with each of the flow rate control valves 217, 219. The flow rate control valves 217, 219 may also be progressively opened and closed manually via a lever (not shown). The flow rate control valves 217, 219 may also include corresponding position sensors operable to generate a signal or information indicative of an actual position of the choke valve, such as to monitor in-real time the actual position of the flow rate control valves 217, 219. The actual positions of the flow rate control valves 217, 219 may include a fully-open flow position, a fully-closed flow position, and intermediate or incremental positions between the fully-open flow position and the fully-closed flow positions. The intermediate positions of the flow rate control valves 217, 219 may be indicative of an amount or percentage that the flow rate control valves 217, 219 are open and, thus, indicative of the flow rate through the flow rate control valves 217, 219.

Although not identified with numerals, each actuator and position sensor of the flow rate control valves 217, 219 may comprise the same or similar structure and/or mode of operation as the actuator 207 and the position sensor 208 described above. Also, each actuator and position sensor of the flow rate control valves 217, 219 may be disposed in association with the corresponding flow rate control valve 217, 219 in a manner that is similar in which the actuator 207 and the position sensor 208 are disposed in association with the metering device 205 described above.

A controller 410 may be operable to monitor and control one or more operations of the cementing unit 200. The controller 410 may be in communication with the various metering valves, metering pumps, and other metering systems described above to adjust or otherwise control density and/or solids fraction of the mixed fluid, the cement slurry, and/or other mixtures formed by the mixing portion 201 of the cementing unit 200. For example, the controller 410 may be operable to control the concentration of the mixed fluid by controlling the flow rates at which the base fluid and the additives are introduced into the displacement tanks 210, 210. The controller 410 may control the flow rate and density and/or solids fraction of the formed mixture, such as the cement slurry, by controlling the metering device 205 and the flow rate control valves 217, 219 to control the flow rates at which the bulk cement and the mixed fluid are introduced into the mixer 202 and the fluid tank 222.

The cement slurry may be discharged from the mixer 202 and perhaps combined with additional mixed fluid downstream from the mixer 202 and received by the fluid tank 222 wherein a plurality of mixing blades or other agitators 224 may agitate the cement slurry to further blend the mixed fluid and bulk cement. The fluid tank 222 may be or comprise a continuous flow channel or pathway for communicating or conveying the cement slurry over a period of time sufficient to permit adequate blending to occur, such that the cement slurry may reach a predetermined level viscosity and/or comprise other properties. The fluid tank 222 may have a FIFO mode of operation, and may comprise a vessel-type outer housing enclosing a receptacle having an elongated flow pathway or space operable to store and communicate the cement slurry therethrough. The fluid tank may comprise a first or mixing portion 255 and a second or averaging portion 257, such that the cement slurry or another fluid introduced from the mixer 202 first flows into the first portion 225 and then flows into the second portion 257 when the first portion 255 is full.

A fluid level sensor 259, 261 may be connected or otherwise disposed in association with each of the first and second portions 255, 257 of the fluid tank 222. The level sensors 259, 261 may be operable to generate signals or information indicative of the amount of fluid contained within the corresponding first and second portions 255, 257. The level sensors 259, 261 may each comprise the same structure and/or mode of operation as the level sensors 211, 213 described above.

The fluid within each of the first and second portions 255, 257 of the fluid tank 222 may be selectively discharged into a discharge fluid conduit 215 and selectively recirculated or directed to other portions of the cementing unit 200. The mixing portion 201 of the cementing unit 200 may further comprise a pump unit 263 selectively operable to pump or otherwise move the fluid from the first portion 255 and into the mixer 202 via the discharge fluid conduit 215 and a recirculation fluid conduit 226. The fluid may be combined with additional cement and/or fluid within the mixer 202, such as to change the density and/or solids fraction of the fluid. The combined fluid may then be communicated to the fluid tank 222 via the fluid conduit 203. Accordingly, the fluid within the first portion 255 of the fluid tank 222 is recirculated through the mixer 202. A fluid valve 228 may be selectively opened to permit the fluid to recirculate through the recirculation fluid conduit 226 and the mixer 202. The fluid valve 228 may be or comprise a ball valve, a globe valve, butterfly valves, and/or another type of fluid valves, such as may be selectively opened and closed to permit and prevent fluid flow.

The fluid valve 228 may be actuated remotely by a corresponding actuator 229 coupled with the fluid valve 228. The actuator 229 may be or comprise an electric actuator, such as a solenoid or motor, or a fluid actuator, such as a pneumatic or hydraulic cylinder or rotary actuator. The fluid valve 228 may also be actuated manually, such as by a lever (not shown). The fluid valve 228 may also include a corresponding position sensor 230 operable to generate a signal or information indicative of an actual position of the fluid valve 228. The position sensor 230 may be operable to monitor in-real time the actual position of the fluid valve 228, which may include an open-flow position and a closed-flow position. The position sensor 230 may be or comprise a proximity sensor, such as a capacitive sensor, an inductive sensor, a magnetic sensor, a Hall effect sensor, and/or a reed switch, among other examples. The position sensor 230 may also or instead include a linear position sensor, such as a linear potentiometer. The position sensor 230 may also or instead include a rotary position sensor, such as an encoder, a rotary potentiometer, a synchro, a resolver, and/or an RVDT, among other examples. Also, the actuator 229 and position sensor 230 may be disposed in association with the fluid valve 228 in a manner that is similar in which the actuator 207 and the position sensor 208 are disposed in association with the metering device 205 described above.

A fluid analyzer 218 may be disposed along the recirculation fluid conduit 226 in a manner permitting monitoring of a fluid flow rate and/or fluid density or solids fraction of the fluid flowing through the recirculation fluid conduit 226. The fluid analyzer 218 may comprise a density sensor operable to measure the fluid density of the fluid or the amount of particles in the fluid, which may include the amount of cement or other additives. The density sensor may emit radiation that is absorbed by different particles in the fluid. Different absorption coefficients may exist for different particles, which may then be utilized to translate the signals or information to determine a density or solids fraction measurement. The fluid analyzer 218 may also comprise a flow rate sensor, such as a flow meter, operable to measure the volumetric and/or mass flow rate of the fluid. The fluid analyzer 218 may be operable to generate signals or information indicative of the flow rate and/or the fluid density of the recirculated fluid and utilized by the controller 410, for example, to facilitate intended changes to the flow rate and/or fluid density of the recirculated fluid.

A pump unit 265 may be selectively operable to recirculate the fluid within the second portion 257 of the fluid tank 222 via the discharge fluid conduit 215 and a recirculation fluid conduit 267. A flow rate control valve 269 may control a flow rate at which the fluid is recirculated through the recirculation fluid conduit 267. The flow rate control valve 269 may comprise the same or similar structure and/or mode of operation as each of the flow rate control valves 217, 219 described above. Although not identified with numerals, the flow rate control valve 269 may also include an actuator and a position sensor having the same or similar structure and/or mode of operation as the actuator 207 and the position sensor 208 described above.

Instead or in addition to being recirculated, the fluid from the fluid tank 222 may be directed into a high pressure pumping portion 250 of the cementing unit 200 to be pumped by one or more high pressure pump units 241, 242. For example, the fluid within the first portion 255 of the fluid tank 222 may be pumped by the pump unit 263 through the fluid discharge conduit 215 and directed into a fluid conduit 271 and one or both fluid inlet conduits 231, 232 to be pumped by one or both of the pump units 241, 242. The fluid valve 228 may be closed and a fluid valve 273 may be opened to permit the fluid to be pumped from the first portion 255 and into the fluid conduit 271. Similarly, the fluid within the second portion 257 of the fluid tank 222 may be pumped by the pump unit 265 through the fluid discharge conduit 215 and directed into the fluid conduit 271 and one or both of the inlet conduits 231, 232 to be pumped by one or both of the pump units 241, 242. The flow rate control valve 269 may be closed and a fluid valve 275 may be opened to permit the fluid to be pumped from the second portion 257 and into the fluid conduit 271.

A fluid valve 277 may be disposed along the discharge fluid conduit 215, such as to selectively fluidly connect and disconnect the first and second portions 255, 257 of the fluid tank 222 and to fluidly connect and disconnect inlet or suction sides of the pump units 263, 265. For example, the fluid valve 277 may be closed when the fluids within the first and second portions 255, 257 are recirculated or directed into the pumping portion 250 of the cementing unit 200 independently of each other.

The fluid valves 273, 275, 277 may comprise the same or similar structure and/or mode of operation as the fluid valve 228 described above. Although not identified with numerals, each of the fluid valves 273, 275, 277 may also include a corresponding actuator and position sensor having the same or similar structure and/or mode of operation as the actuator 229 and the position sensor 230 described above.

A fluid analyzer 278 may be disposed along the fluid conduit 271 in a manner permitting monitoring of a fluid flow rate and/or fluid density of the fluid being supplied to the pump units 241, 242 via the fluid conduit 271. The fluid analyzer 278 may comprise the same or similar structure and/or mode of operation as the fluid analyzer 218 described above.

The pumping portion 250 of the cementing unit 200 may comprise the high pressure pump units 241, 242 fluidly coupled along the inlet conduits 231, 232 and operable to selectively receive the fluid from the fluid tank 222 and the displacement tanks 210, 212 and discharge the received fluid into the wellbore 104 or recirculate the fluid back to the displacement tanks 210, 212. For example, the pump units 241, 242 may receive the mixed fluid or the cement slurry from the fluid tank 222, as described above, and pump the received fluid as intended. The pump units 241, 242 may also receive the base fluid or the mixed fluid from the displacement tanks 210, 212 fluidly connected with the pump units 241, 242 via the inlet conduits 231, 232, and pump the received fluid as intended. Although the cementing unit 200 is shown comprising two pump units 241, 242, it is to be understood that the cementing unit 200 may include other quantities of pump units within the scope of the present disclosure.

A bypass conduit 233 may extend between the displacement tanks 210, 212 and the discharge fluid conduit 215 to fluidly connect the displacement tanks 210, 212 with the fluid tank 222 while bypassing the pump units 241, 242. The bypass conduit 233 may be fluidly connected with the fluid conduit 128, such as may permit the cement slurry, mixed fluid, or another fluid from the batch mixer 126 to be received by the cementing unit 200 and pumped by the pump units 241, 242. For example, the fluid from the fluid conduit 128 may be communicated via the bypass conduit 233 directly into the fluid inlet conduits 231, 232 or the fluid may be drawn from the fluid conduits 128, 233 by the pump unit 263 and directed into the inlet conduits 231, 232 via the fluid conduit 271. Fluid valves 282, 284 may be disposed along the bypass conduit 233, such as to selectively permit the fluid from the fluid conduit 128 to be introduced into the cementing unit 200 and directed to the pump units 241, 242, as described above.

One or more flow rate sensors 244, 245 may be disposed along the inlet conduit 231 or otherwise in association with the pump unit 241 in a manner permitting monitoring of a fluid flow rate of the fluid being introduced into the pump unit 241. For example, the flow sensors 244, 245 may be fluidly coupled in association with opposing fluid inlets 326 (shown in FIG. 3) of the pump unit 241. Each of the flow sensors 244, 245 may be or comprise a flow meter operable to measure the volumetric and/or mass flow rate of the fluid introduced into the pump unit 241 and may be operable to generate a signal or information indicative of the flow rate of the fluid and, thus, facilitate monitoring of the flow rate of the fluid discharged by the pump unit 241. Similarly, one or more flow sensors 246, 247 may be disposed along the inlet conduit 232 or otherwise in association with the fluid inlets 326 of the pump unit 242. Each of the flow sensors 246, 247 may generate a signal or information indicative of a flow rate of the fluid introduced into the pump unit 242 and, thus, facilitate monitoring of the flow rate of the fluid discharged by the pump unit 242.

A corresponding inlet valve 221, 223, 225, 227 may be disposed in association with each fluid inlet 326 of each pump unit 241, 242, such as to selectively fluidly connect and disconnect each pump unit 241, 242 from a fluid source, such as the fluid tank 222, the displacement tanks 210, 212, and/or other portions of the cementing unit 200. For example, the inlet valves 221, 223 may be coupled along the inlet conduit 231 on opposing sides of the pump unit 241 or otherwise in association with the opposing fluid inlets 326 of the pump unit 241. Similarly, the inlet valves 225, 227 may be coupled along the inlet conduit 232 on opposing sides of the pump unit 242 or otherwise in association with the opposing fluid inlets 326 of the pump unit 242.

The cementing unit 200 may further comprise outlet conduits 234, 235, each fluidly connected with a corresponding fluid outlet 335 (shown in FIG. 3) of each pump unit 241, 242. Each outlet conduit 234, 235 may include a corresponding fluid outlet valve 238, 239, which may selectively fluidly connect and disconnect each pump unit 241, 242 from the wellbore 104 and/or other portions of the cementing unit 200 located downstream from the fluid outlet valves 238, 239. The outlet conduits 234, 235 may be fluidly connected with each other via an intermediate or joining conduit 236. A fluid isolation valve 237 may be disposed along the joining conduit 236 to selectively fluidly connect and disconnect the outlet conduits 234, 235. The output conduits 234, 235 and the joining conduit 236 may be or comprise at least a portion of that which is known in the art as a treating or discharge manifold 270.

The outlet conduit 234 may be fluidly connected with a fluid conduit 240, which may be or form a portion of the fluid conduit 124 to fluidly couple the pump unit 241, and perhaps the pump unit 242, with the wellbore 104. The fluid conduit 240 may be or comprise at least a portion of that which is known in the art as a cement line 240, which may be utilized to inject the cement slurry into the wellbore 104 during cementing operations. The outlet conduit 235 may be fluidly connected with a fluid conduit 243, which may form a portion of the fluid conduit 124 to fluidly couple the pump unit 242, and perhaps pump unit 241, with the wellbore 104. The fluid conduit 243 may be or comprise at least a portion of that which is known in the art as a kill line 243, which may be utilized to inject the cement slurry into the wellbore 104 during well kill operations. The outlet conduit 234 may be selectively isolated from the cement line 240 by a fluid valve 248, while the outlet conduit 235 may be selectively isolated from the kill line 243 by a fluid valve 249. The discharge manifold 270, the fluid valves 237, 238, 239, 248, 249, the cement line 240, and the kill line 243 may be or comprise that which is known in the art as treating iron or equipment.

The fluid valves 221, 223, 225, 227, 237, 238, 239, 248, 249, 282, 284 may comprise the same or similar structure and/or mode of operation as the fluid valve 228 described above. Although not identified with numerals, each of the fluid valves 221, 223, 225, 227, 237, 238, 239, 248, 249, 282, 284 may also include a corresponding actuator and position sensor having the same or similar structure and/or mode of operation as the actuator 229 and the position sensor 230 described above. As the fluid valves 221, 223, 225, 227, 282, 284 are located on the inlet side of the pump units 241, 242 and the fluid valves 237, 238, 239, 248, 249 are located on the outlet side of the pump units 241, 242, the fluid valves 237, 238, 239, 248, 249 may be adapted to operate under high pressures generated by the pump units 241, 242 and may comprise a higher pressure rating than the fluid valves 221, 223, 225, 227, 282, 284.

The discharge manifold 270 may be fluidly connected with an adjustable choke valve 252, such as may be operable to bleed or otherwise relieve fluid pressure from the discharge manifold 270. The choke valve 252 may be operable to progressively open, such as to permit the pressurized fluid within the discharge manifold 270 to relieve or otherwise flow out of the discharge manifold 270 via a relief conduit 254. The relief conduit 254 may fluidly connect the discharge manifold 270 with the displacement tanks 210, 212, such as may permit the pressurized fluid within the discharge manifold 270 to be discharged into the displacement tanks 210, 212. The choke valve 252 may be or comprise a needle valve, a metering valve, a butterfly valve, a globe valve, or another valve operable to progressively or gradually open and close to control rate of fluid flow permitted through the choke valve 252.

The choke valve 252 may be remotely progressively opened and closed by a corresponding actuator 256 operatively coupled with the choke valve 252. The choke valve 252 may also be progressively opened and closed manually via a lever or a wheel 258. The choke valve 252 may also include a corresponding position sensor 260 operable to generate a signal or information indicative of an actual position of the choke valve, such as to monitor in-real time the actual position of the choke valve 252. The actual positions of the choke valve 252 may include a fully-open flow position, a fully-closed flow position, and intermediate or incremental positions between the fully-open flow position and the fully-closed flow positions. Each intermediate position may be indicative of an amount or percentage that the choke valve 252 is open and, thus, indicative of the flow rate through the choke valve 252. The actuator 256 and the position sensor 260 of the choke valve 252 may comprise the same or similar structure and/or mode of operation as the actuator 207 and the position sensor 208 described above.

The cementing unit 200 may further comprise bleed valves 262, 264, fluidly connected in series between the pump units 241, 242 and the choke valve 252. The bleed valves 262, 264 may be disposed along the outlet conduit 235 and may be operable to selectively fluidly connect and disconnect the choke valve 252 from the discharge manifold 270. The bleed valves 262, 264 may comprise the same or similar structure and/or mode of operation as the fluid valve 228 described above. Although not identified with numerals, each of the bleed valves 262, 264 may also include a corresponding actuator and position sensor having the same or similar structure and/or mode of operation as the actuator 229 and the position sensor 230 described above. As the fluid valves 252, 262, 264 are located on the outlet side of the pump units 241, 242, such fluid valves 252, 262, 264 may be adapted to operate under the high pressures generated by the pump units 241, 242.

Figure 3:
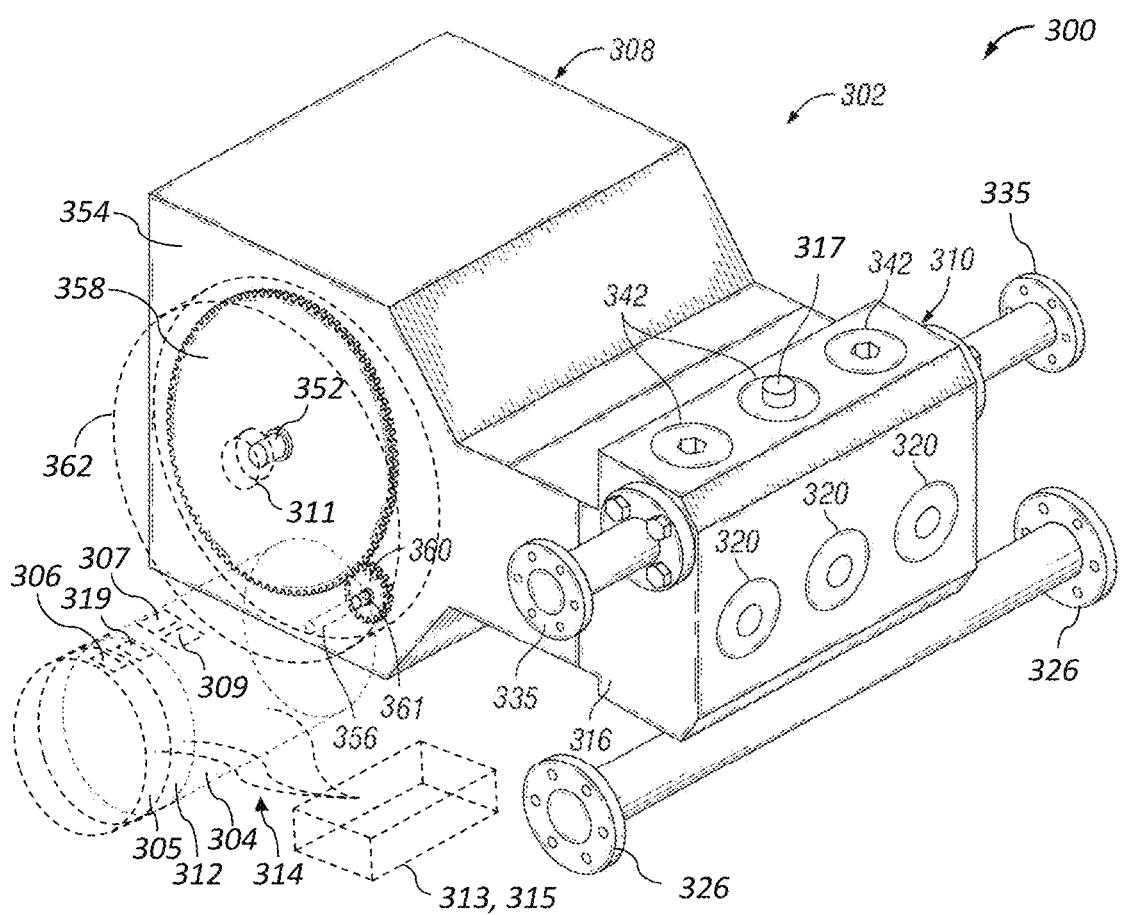
FIG. 3 is a perspective view of a portion of an example implementation of the apparatus shown in FIG. 2 according to one or more aspects of the present disclosure.

The cementing unit 200 may further comprise one or more pressure sensors disposed in association with the pump units 241, 242, the discharge manifold 270, and/or the cement line 240 in a manner permitting the sensing of fluid pressure within the pump units 241, 242, the discharge manifold 270, and/or the cement line 240. Each pressure sensor may be operable to generate an electrical signal and/or information indicative of the fluid pressure within the pump units 241, 242, the discharge manifold 270, and/or cement line 240. For example, a pressure sensor 276 may be disposed in association with the cement line 240, between the wellhead 108 and the fluid valve 248. As shown in FIG. 3, a pressure sensor 317 may also or instead be disposed in association with each pump unit 241, 242 to monitor the fluid pressure within each pump unit 241, 242 and/or at the corresponding fluid outlets 335.

The controller 410 may be further operable to monitor and control various operational properties or parameters of the cementing unit 200. To facilitate the monitoring of the cementing unit 200, the controller 410 may be in communication with the various sensors of the cementing unit 200 described above. For example, the controller 410 may be in communication with the valve position sensors (e.g., position sensors 208, 230, 260) to permit the controller 410 to receive the feedback signals generated by the position sensors and, thus, confirm that the fluid valves (e.g., 205, 217,228, 221, 252) transitioned to their intended positions. The controller 410 may also be in communication with the pressure sensors 276, 317, the flow rate sensors 209, 244, 245, 246, 247, the fluid level sensors 211, 213, 259, 261, and the fluid analyzers 218, 278, such as may permit the controller 410 to receive the information indicative of the fluid pressure generated by the pump units 241, 242, the fluid flow rates generated by the pump units 220, 241, 242, 263, 265, the densities of fluids being pumped by the cementing unit 200, and the amount of fluid within the fluid tank 222 and displacement tanks 210, 212. To facilitate control of the cementing unit 200, the controller 410 may be in communication with the valve actuators (e.g. actuators 207, 229, 256) to permit the controller 410 to open and close or otherwise control the fluid valves. The controller 410 may also be in communication with one or more portions of the pump units 220, 241, 242, 263, 265, such as may permit the controller 410 to activate, deactivate, and control pumping or operating speed of the pump units 220, 241, 242, 263, 265, as well as the flow rate and pressure generated by the pump units 220, 241, 242, 263, 265. Accordingly, the controller 410 may be operable to monitor and control the cementing unit 200, including monitoring and controlling one or more operational parameters, to implement example methods and/or processes described herein.

Communication between the controller 410 and the various portions of the cementing unit 200 may be via wired and/or wireless communication means. However, for clarity and ease of understanding, such communication means are not depicted in FIG. 2, as a person having ordinary skill in the art will appreciate that such communication means are within the scope of the present disclosure. Furthermore, although the controller 410 is shown as being associated with the cementing unit 200, the controller 410 may be implemented as part of the control/power center 130 or otherwise located externally from the cementing unit 200.

Figure 4:
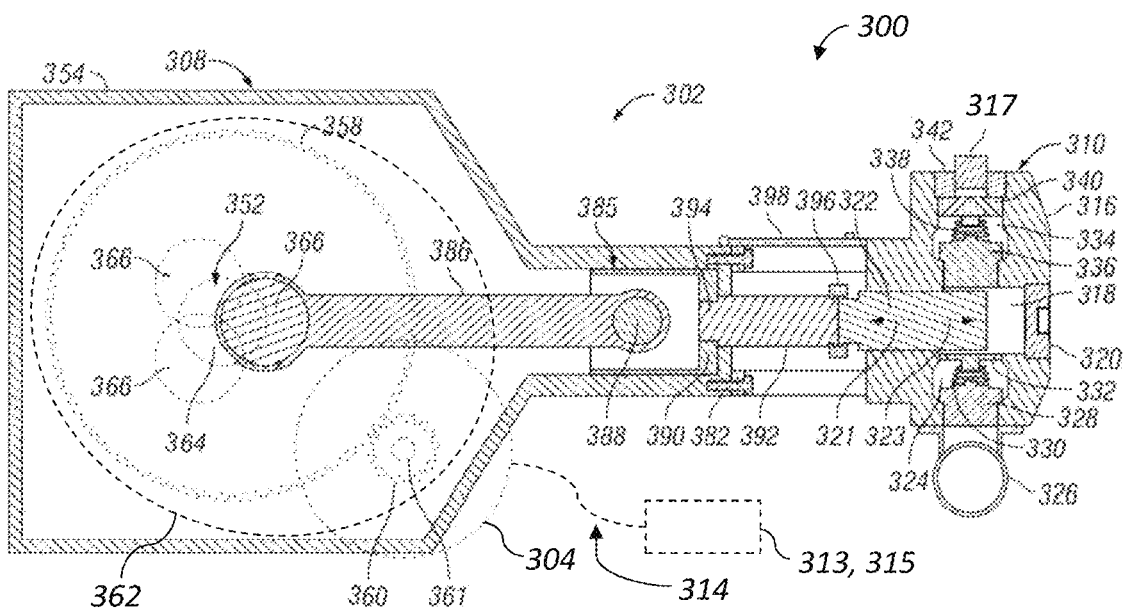
FIG. 4 is a sectional view of a portion of the apparatus shown in FIG. 3 according to one or more aspects of the present disclosure.

FIG. 3 is a perspective view of a portion of an example implementation of the pump unit 241, 242 shown in FIG. 2 according to one or more aspects of the present disclosure, and designated in FIG. 3 by reference numeral 300. FIG. 4 is a side sectional view of a portion of the pump unit 300 shown in FIG. 3. Portions of the pump unit 300 shown in FIGS. 3 and 4 are shown in phantom lines, such as to prevent obstruction from view of other portions of the pump unit 300. The following description refers to FIGS. 1-4, collectively.

The pump unit 300 comprises a pump 302 operatively coupled with and actuated by a prime mover 304. The pump 302 includes a power section 308 and a fluid section 310. The fluid section 310 may comprise a pump housing 316 having a plurality of fluid chambers 318. One end of each fluid chamber 318 may be plugged by a cover plate 320, such as may be threadedly engaged with the pump housing 316 while an opposite end of each fluid chamber 318 may contain a reciprocating member 322 slidably disposed therein and operable to displace the fluid within the corresponding fluid chamber 318. Although the reciprocating member 322 is depicted as a plunger, the reciprocating member 322 may also be implemented as a piston, diaphragm, or another reciprocating fluid displacing member.

Each fluid chamber 318 is fluidly connected with a corresponding one of a plurality of fluid inlet cavities 324 each adapted for communicating fluid from fluid inlets 326 into a corresponding fluid chamber 318. The fluid inlets 326 may be in fluid communication with a corresponding inlet conduit 231, 232. Each fluid inlet cavity 324 may contain an inlet valve 328 operable to control fluid flow from the fluid inlets 326 into the fluid chamber 318. Each inlet valve 328 may be biased toward a closed flow position by a first spring or another biasing member 330, which may be held in place by an inlet valve stop 332. Each inlet valve 328 may be actuated to an open flow position by a selected or predetermined differential pressure between the corresponding fluid inlet cavity 324 and the fluid inlets 326.

Each fluid chamber 318 is also fluidly connected with a fluid outlet cavity 334 extending through the pump housing 316 transverse to the reciprocating members 322. The fluid outlet cavity 334 is adapted for communicating pressurized fluid from each fluid chamber 318 into one or more fluid outlets 335 fluidly connected at one or both ends of the fluid outlet cavity 334. The fluid outlets 335 may be in fluid communication with a corresponding outlet conduit 234, 235. The fluid section 310 also contains a plurality of outlet valves 336 each operable to control fluid flow from a corresponding fluid chamber 318 into the fluid outlet cavity 334. Each outlet valve 336 may be biased toward a closed flow position by a spring or another biasing member 338, which may be held in place by an outlet valve stop 340. Each outlet valve 336 may be actuated to an open flow position by a selected or predetermined differential pressure between the corresponding fluid chamber 318 and the fluid outlet cavity 334. The fluid outlet cavity 334 may be plugged by cover plates 342, such as may be threadedly engaged with the pump housing 316.

During pumping operations, portions of the power section 308 of the pump unit 300 rotate in a manner that generates a reciprocating linear motion to move the reciprocating members 322 longitudinally within the corresponding fluid chambers 318, thereby alternatingly drawing and displacing the fluid within the fluid chambers 318. With regard to each reciprocating member 322, as the reciprocating member 322 moves out of the fluid chamber 318, as indicated by arrow 321, the pressure of the fluid inside the corresponding fluid chamber 318 decreases, thus creating a differential pressure across the corresponding fluid inlet valve 328. The pressure differential operates to compress the biasing member 330, thus actuating the fluid inlet valve 328 to an open flow position to permit the fluid from the fluid inlets 326 to enter the corresponding fluid inlet cavity 324. The fluid then enters the fluid chamber 318 as the reciprocating member 322 continues to move longitudinally out of the fluid chamber 318 until the pressure difference between the fluid inside the fluid chamber 318 and the fluid at the fluid inlets 326 is low enough to permit the biasing member 330 to actuate the fluid inlet valve 328 to the closed flow position. As the reciprocating member 322 begins to move longitudinally back into the fluid chamber 318, as indicated by arrow 323, the pressure of the fluid inside of fluid chamber 318 begins to increase. The fluid pressure inside the fluid chamber 318 continues to increase as the reciprocating member 322 continues to move into the fluid chamber 318 until the pressure of the fluid inside the fluid chamber 318 is high enough to overcome the pressure of the fluid inside the fluid outlet cavity 334 and compress the biasing member 338, thus actuating the fluid outlet valve 336 to the open flow position and permitting the pressurized fluid to move into the fluid outlet cavity 334, the fluid outlets 335, and the corresponding fluid outlet conduit 234, 235.

The pump unit 300 may further comprise a pressure sensor 317 disposed in association with the fluid section 310 in a manner permitting the sensing of fluid pressure at the fluid outlets 335. For example, the pressure sensor 317 may extend through one or more of the cover plates 342 or other portions of the corresponding pump housing 316 to monitor pressure within the fluid outlet cavity 334 and, thus, the fluid outlets 335 and the corresponding outlet conduits 234, 235.

The fluid flow rate generated by the pump unit 300 may depend on the physical size of the reciprocating members 322 and fluid chambers 318, as well as the pump unit operating speed, which may be defined by the speed or rate at which the reciprocating members 322 cycle or move within the fluid chambers 318. The pumping speed, such as the speed or the rate at which the reciprocating members 322 move, may be related to the rotational speed of the power section 308 and/or the prime mover 304. Accordingly, the fluid flow rate generated by the pump unit 300 may be controlled by controlling the rotational speed of the power section 308 and/or the prime mover 304.

The prime mover 304 may comprise an engine, such as a gasoline engine or a diesel engine, an electric motor, such as a synchronous or asynchronous electric motor, including a synchronous permanent magnet motor, a hydraulic motor, or another prime mover operable to drive or otherwise rotate a drive shaft 352 of the power section 308. The drive shaft 352 may be enclosed and maintained in position by a power section housing 354. To prevent relative rotation between the power section housing 354 and the prime mover 304, the power section housing 354 and prime mover 304 may be fixedly coupled together or to a common base, such as a trailer of the mobile carrier 111.

The prime mover 304 may comprise a rotatable output shaft 356 operatively connected with the drive shaft 352 via a gear train or transmission 362, which may comprise at least one spur gear 358 coupled with the drive shaft 352 and at least one pinion gear 360 coupled with a support shaft 361. The output shaft 356 and the support shaft 361 may be coupled, such as may facilitate transfer of torque from the prime mover 304 to the support shaft 361, the pinion gear 360, the spur gear 358, and the drive shaft 352. For clarity, FIGS. 3 and 4 show the transmission 362 comprising a single spur gear 358 engaging a single pinion gear 360, however, it is to be understood that the transmission 362 may comprise two or more sets of corresponding gears, such as may permit the transmission 362 to be shifted between different gear configurations or speeds to control the operating speed of the drive shaft 352 and torque transferred to the drive shaft 352. Accordingly, the transmission 362 may be shifted to vary the pumping speed and torque of the power section 308 to vary the fluid flow rate and maximum fluid pressure generated by the fluid section 310 of the pump unit 300.

The drive shaft 352 may be implemented as a crankshaft comprising a plurality of axial journals 364 and offset journals 366. The axial journals 364 may extend along a central axis of rotation of the drive shaft 352, while the offset journals 366 may be offset from the central axis of rotation by a selected or predetermined distance and spaced 120 degrees apart with respect to the axial journals 364. The drive shaft 352 may be supported in position within the power section 308 by the power section housing 354, wherein two of the axial journals 364 may extend through opposing openings in the power section housing 354.

The power section 308 and the fluid section 310 may be coupled or otherwise connected together. For example, the pump housing 316 may be fastened with the power section housing 354 by a plurality of threaded fasteners 382. The pump 302 may further comprise an access door 398, which may facilitate access to portions of the pump 302 located between the power section 308 and the fluid section 310, such as during assembly and/or maintenance of the pump 302.

To transform and transmit the rotational motion of the drive shaft 352 to a reciprocating linear motion of the reciprocating members 322, a plurality of crosshead mechanisms 385 may be utilized. For example, each crosshead mechanism 385 may comprise a connecting rod 386 pivotally coupled with a corresponding offset journal 366 at one end and with a pin 388 of a crosshead 390 at an opposing end. During pumping operations, walls and/or interior portions of the power section housing 354 may guide each crosshead 390, such as may reduce or eliminate lateral motion of each crosshead 390. Each crosshead mechanism 385 may further comprise a piston rod 392 coupling the crosshead 390 with the reciprocating member 322. The piston rod 392 may be coupled with the crosshead 390 via a threaded connection 394 and with the reciprocating member 322 via a flexible connection 396.

The pump unit 300 may further comprise one or more rotary sensors 311 operable to generate a signal or information indicative of rotational position, rotational speed, and/or operating frequency of the pump 302. For example, one or more of the rotary sensors 311 may be operable to convert angular position or motion of the drive shaft 352 or another rotating portion of the power section 308 to an electrical signal indicative of pumping speed of the pump unit 300. The rotary sensor 311 may be mounted in association with an external portion of the drive shaft 352 or other rotating members of the power section 308. The rotary sensor 311 may also or instead be mounted in association of the prime mover 304 to monitor the rotational position and/or rotational speed of the prime mover 304, which may be utilized to determine the pumping speed of the pump unit 300. The rotary sensor 311 may be or comprise an encoder, a rotary potentiometer, a synchro, a resolver, and/or an RVDT, among other examples.

The pump unit 300 may also include prime mover power and/or control components, such as a variable speed or frequency drive (VFD) 313 and/or an engine throttle control 315, which may be utilized to facilitate control of the prime mover 304 by the controller 410. The VFD 313/throttle control 315 may be connected with or otherwise in communication with the prime mover 304 via mechanical and/or electrical communication means 314. The pump unit 300 may comprise the VFD 313 in implementations in which the prime mover 304 is or comprises an electric motor and the pump unit 300 may comprise the engine throttle control 315 in implementations in which the prime mover 304 is or comprises an engine. For example, the VFD 313 may receive control signals from the controller 410 and output corresponding electrical power to control the speed and the torque output of the prime mover 304 and, thus, control the pumping speed and fluid flow rate of the pump unit 300, as well as the maximum pressure generated by the pump unit 300. The throttle control 315 may receive control signals from the controller 410 and output a corresponding electrical or mechanical throttle control signal to control the speed of the prime mover 304 to control the pumping speed and, thus, the fluid flow rate generated by the pump unit 300. Although the VFD 313/throttle control 315 is shown located near or in association with the prime mover 304, the VFD 313/throttle control 315 may be located or disposed at a distance from the prime mover 304. For example, the VFD 313/throttle control 315 may be or form a portion of the control/power center 130.

The prime mover 304 may be cooled and/or lubricated by a lube pump unit 312 operatively coupled with the prime mover 304. The lube pump unit 312 may impart flow of lubricant through portions of the prime mover 304, such as to remove heat from the prime mover 304 and/or lubricate moving portions of the prime mover 304. The lube pump unit 312 may comprise a pump portion (not shown) and an actuator portion (not shown) operable to actuate the pump portion. The actuator portion of the lube pump unit 312 and, thus, the pumping operations of the lube pump unit 312 may be controlled and/or powered by the VFD 313, which may be connected with or otherwise in communication with the lube pump unit 312 via the communication means 314, such as electrical communication means. Functionality or operation of the lube pump unit 312 may be monitored or confirmed by monitoring lubricant pressure generated by the lube pump unit 312. For example, the lubricant pressure may be monitored by a corresponding pressure sensor 319 disposed in association with the lube pump unit 312 and in communication with the controller 410.

The prime mover 304 may also or instead be cooled by a cooling fan assembly or blower unit 305 disposed in association with the prime mover 304. The blower unit 305 may impart air movement, such as to remove heat from the prime mover 304 or otherwise prevent the prime mover 304 from overheating. The blower unit 305 may also remove heat from the lubricant being pumped by the lube pump unit 312. The blower unit 305 may comprise a plurality of blades (not shown) and an actuator portion (not shown) operable to actuate the blades. The actuator portion of the blower unit 305 and, thus, the cooling operations of the blower unit 305 may be controlled and/or powered by the VFD 313. The VFD 313 may be connected with or otherwise in communication with the blower unit 305 via the communication means 314, such as electrical communication means. Functionality or operation of the blower unit 305 may be monitored or confirmed by monitoring air pressure generated by the blower unit 305. The air pressure may be monitored by a corresponding pressure sensor 306 disposed in association with the blower unit 305 and in communication with the controller 410.

A temperature sensor 307, such as a resistance temperature detector (RTD), may be disposed in association with the prime mover 304, such as to generate a signal or information indicative of a temperature of the prime mover 304. For example, the temperature sensor 307 may monitor the temperature within a motor winding, an engine housing, or within another portion of the prime mover 304. The temperature sensor 307 may be in communication with the controller 410, which may shut down the prime mover 304 if the detected temperature level exceeds a predetermined temperature level.

A moisture sensor 309 may also be disposed in association with the prime mover 304, such as to generate a signal or information indicative of moisture present at or near the prime mover 304. The moisture sensor 309 may be in communication with the controller 410, which may shut down the prime mover 304 if the moisture is detected by the moisture sensor 309.

The controller 410 may be further operable to monitor and control various operational parameters of the cementing unit 200, including the pump unit 300. To facilitate the monitoring of the pump unit 300, the controller 410 may be in communication with the various sensors of the pump unit 300 including the pressure sensors 306, 317, 119, the temperature sensor 307, the moisture sensor 309, and the rotary sensor 311. To facilitate control of the pump unit 300, the controller 410 may be in communication with the transmission 362, such as to control the flow rate and pressure generated by the pump unit 300. The controller 410 may also be in communication with the prime mover 304, the lube pump unit 312, and the blower unit 305 via the VFD 313/throttle control 315, such as may permit the controller 410 to activate, deactivate, and control pumping speed of the pump unit 300, the lube pump unit 312, and the blower unit 305, as well as the flow rate and pressure generated by the pump unit 300.

Although FIGS. 3 and 4 show the pump unit 300 comprising a triplex reciprocating pump 302, which has three fluid chambers 318 and three reciprocating members 322, implementations within the scope of the present disclosure may include the pump 302 as or comprising a quintuplex reciprocating pump having five fluid chambers 318 and five reciprocating members 322, or a pump having other quantities of fluid chambers 318 and reciprocating members 322. It is further noted that the pump 302 described above and shown in FIGS. 3 and 4 is merely an example, and that other pumps, such as diaphragm pumps, gear pumps, external circumferential pumps, internal circumferential pumps, lobe pumps, and other positive displacement pumps, are also within the scope of the present disclosure.

Figure 5:
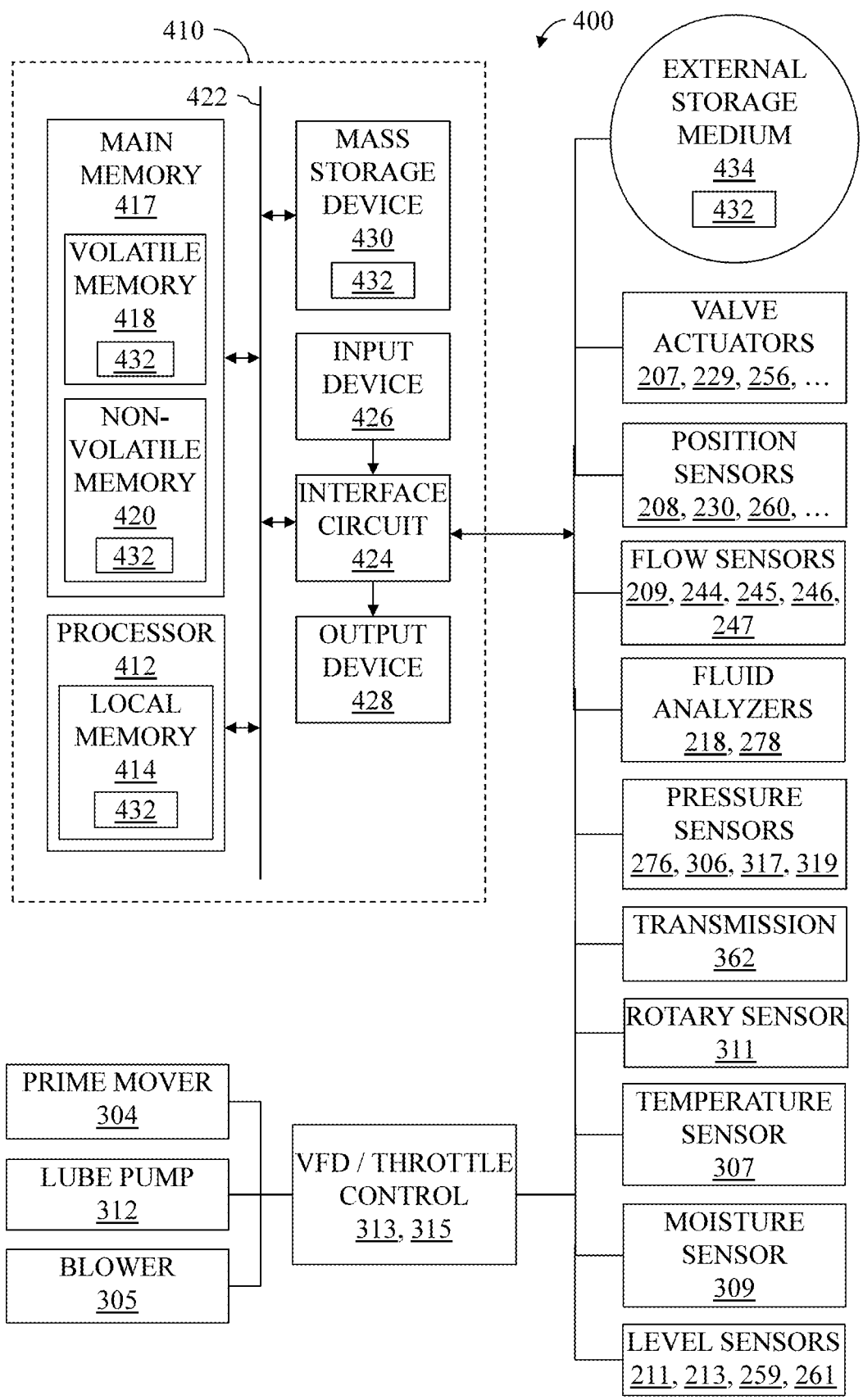
FIG. 5 is a schematic view of an example implementation of apparatus according to one or more aspects of the present disclosure.

Various portions of the cementing unit 200 described above may collectively form a control system 400, which may be operable to monitor and/or control operations of the cementing unit 200, including the fluid pressure and fluid flow rate generated by the pump units 241, 242. FIG. 5 is a schematic view of a portion of an example implementation of a control system 400 according to one or more aspects of the present disclosure. The following description refers to FIGS. 1-5, collectively.

The control system 400 may include the controller 410 in communication with the valve actuators (e.g. valve actuators 207, 229, 256), the position sensors (e.g., position sensors 208, 230, 260), the flow sensors 209, 244, 245, 246, 247, fluid analyzers 218, 278, the pressure sensors 276, 306, 317, 319, the transmission 362, the rotary sensor 311, the temperature sensor 307, the moisture sensor 309, the fluid level sensors 211, 213, 259, 261, and the prime mover 304, the lube pump unit 312, and the blower unit 305 via the VFD 313/throttle control 315. For clarity, these and other components in communication with the controller 410 will be collectively referred to hereinafter as "sensors and controlled components." The controller 410 may be operable to receive signals or information from the sensors of the control system 400 indicative of the various operational parameters of the cementing unit 200. The controller 410 may be further operable to process such operational parameters and communicate control signals to the controlled components of the cementing unit 200 to execute example machine-readable instructions to implement at least a portion of one or more of the example methods and/or processes described herein, and/or to implement at least a portion of one or more of the example systems described herein.

The controller 410 may be or comprise, for example, one or more processors, special-purpose computing devices, servers, personal computers, personal digital assistant (PDA) devices, smartphones, internet appliances, and/or other types of computing devices. The controller 410 may comprise a processor 412, such as a general-purpose programmable processor. The processor 412 may comprise a local memory 414, and may execute coded instructions 432 present in the local memory 414 and/or another memory device. The processor 412 may execute, among other things, machine-readable instructions or programs to implement the example methods and/or processes described herein. The programs stored in the local memory 414 may include program instructions or computer program code that, when executed by an associated processor, facilitate the cementing unit 200 to perform the example methods and/or processes described herein. The processor 412 may be, comprise, or be implemented by one or a plurality of processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 412 may be in communication with a main memory 417, such as may include a volatile memory 418 and a non-volatile memory 420, perhaps via a bus 422 and/or other communication means. The volatile memory 418 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 420 may be, comprise, or be implemented by read-only memory, flash memory, and/or other types of memory devices. One or more memory controllers (not shown) may control access to the volatile memory 418 and/or non-volatile memory 420. The controller 410 may be operable to store or record information entered by the human operators and/or information generated by the sensors and controlled components on the main memory 417.

The controller 410 may also comprise an interface circuit 424. The interface circuit 424 may be, comprise, or be implemented by various types of standard interfaces, such as an Ethernet interface, a universal serial bus (USB), a third generation input/output (3GIO) interface, a wireless interface, and/or a cellular interface, among others. The interface circuit 424 may also comprise a graphics driver card. The interface circuit 424 may also comprise a communication device, such as a modem or network interface card to facilitate exchange of data with external computing devices via a network (e.g., Ethernet connection, digital subscriber line (DSL), telephone line, coaxial cable, cellular telephone system, satellite, etc.). One or more of the sensors and controlled components may be connected with the controller 410 via the interface circuit 424, such as may facilitate communication between the sensors and controlled components and the controller 410.

One or more input devices 426 may also be connected to the interface circuit 424. The input devices 426 may permit the human operators to enter the coded instructions 432, operational set-points, and/or other data into the processor 412. The operational set-points may include, but not limited to, a pressure set-point, a flow rate set-point, a pump operating or pumping speed set-point, a fluid volume set-point, and a time or duration set-point, among other examples. Additional operational set-points may be described below. The input devices 426 may be, comprise, or be implemented by a keyboard, a mouse, a touchscreen, a track-pad, a trackball, an isopoint, and/or a voice recognition system, among other examples. One or more output devices 428 may also be connected to the interface circuit 424. The output devices 428 may be, comprise, or be implemented by display devices (e.g., a liquid crystal display (LCD) or cathode ray tube display (CRT)), printers, and/or speakers, among other examples. The controller 410 may also communicate with one or more mass storage devices 430 and/or a removable storage medium 434, such as may be or include floppy disk drives, hard drive disks, compact disk (CD) drives, digital versatile disk (DVD) drives, and/or USB and/or other flash drives, among other examples.

The coded instructions 432, the operational set-points, and/or other data may be stored in the mass storage device 430, the main memory 417, the local memory 414, and/or the removable storage medium 434. Thus, the controller 410 may be implemented in accordance with hardware (perhaps implemented in one or more chips including an integrated circuit, such as an application specific integrated circuit), or may be implemented as software or firmware for execution by the processor 412. In the case of firmware or software, the implementation may be provided as a computer program product including a computer readable medium or storage structure embodying computer program code (i.e., software or firmware) thereon for execution by the processor 412.

The coded instructions 432 may include program instructions or computer program code that, when executed by the processor 412, may cause the cementing unit 200 to perform methods, processes, and/or routines described herein. For example, the controller 410 may receive and process the operational set-points entered by the human operators and the signals or information generated by the various sensors described herein indicative of the operational parameters of the cementing unit 200. Based on the received operational set-points and operational parameters, the controller 410 may send signals or information to the various controlled components to cause the cementing unit 200 and/or other portions of the wellsite system 100 to automatically perform and/or undergo one or more operations or routines within the scope of the present disclosure. For example, the controller 410 may cause the cementing unit 200 to perform an initialization of the cementing unit 200, a pressure calibration of the cementing unit 200, a pressure test of the cementing unit 200, an over pressure shut-down test of the cementing unit 200, a flow rate calibration of the cementing unit 200, a fluid or hydraulic horsepower test of the cementing unit 200, a pumping test of the cementing unit 200, a mixing test of the cementing unit 200, a fluid pumping operation of the cementing unit 200, among other examples, substantially without manual control of the various portions of the cementing unit 200 by the human operators. The controller 410 may also assess operational health of the cementing unit 200, including the pump units 241, 242, the fluid valves (e.g., fluid valves 205, 217, 221, 252), and the discharge manifold 270. Also, if a plurality of cementing units 200 are utilized at the wellsite 102 to perform a cementing job or operation, the controller 410 may receive information designating which one or more of the plurality of cementing units 200 may perform the operations described herein.

The pressure and flow rate tests may be performed by the cementing unit 200 before the fluid pumping operations. For example, the pressure test may permit an automated verification that the high pressure portions of the cementing unit 200, including the manifold 270 and the fluid valves 237, 238, 239, 248, 249, 252, 262, 264, are properly fastened and that there are no leaks that may cause safety or service quality issues during the fluid pumping operation. The pressure test may also validate that the cementing unit 200 is functioning well enough to reach intended high pressures to perform the fluid pumping operation. The flow rate test may validate that the cementing unit 200, including the pump units 241, 242, is functioning well enough to reach intended high flow rates that may be utilized during the fluid pumping operation. The fluid pumping operation may include automated pumping of the cement slurry or another fluid into the wellbore 104 in a predetermined manner and at a predetermined flow rate and/or pressure. Additional testing operations may be performed to test various other operations that may be conducted before or during the fluid pumping operations, including the over pressure shut-down test, the hydraulic horsepower test, the pumping test, and the mixing test.

The initialization of the cementing unit 200 may be performed before the fluid pumping operation to confirm that the cementing unit 200 may pump the cement slurry at the intended pressure and measure the fluid pressure accurately. During or after the initialization, the pressure calibration of the cementing unit 200 may be performed. The pressure calibration may include the controller 410 executing the coded instructions 432 or an algorithm to sweep through various prime mover speeds and/or transmission gear settings to generate a baseline for a database comprising data points correlating a particular operating speed of the cementing unit 200 and a resulting pressure generated by the cementing unit 200. During pressure calibration, the coded instructions 432 may cause the controller 410 to increase the output pressure of the cementing unit 200 to automatically and continuously check for deviations from an expected baseline behavior and utilize feedback, feedforward, and ramping control to update the database with the optimal correlation of the various cementing unit pumping speeds. Accordingly, the pressure calibration may provide an estimated pressure ramp indicative of pressure generated by the cementing unit 200 in response or with respect to the operating or pumping speed of the pump units 241, 242. Accordingly, the estimated pressure ramp may be utilized by the controller 410 to automatically control the pumping speed of the cementing unit 200 by controlling the prime mover 304 and/or transmission 362 to control the pressure of the cement or another fluid during the fluid pumping operation.

During the various initialization, calibration, and test operations of the cementing unit 200 described above, the cementing unit 200 may utilize the pump units 220, 263, 265, 241, 242 to pump water, brine, mud, the base fluid, the mixed fluid, the cement slurry, and/or other fluids from the fluid tank 222, the displacement tanks 210, 212, and/or other sources, such as the tanks 112, the container 114, and/or the batch mixer 126. Accordingly, unless described otherwise, the one or more fluids being pumped by the cementing unit 200, may be referred to hereinafter simply as "a fluid."

Figure 6:
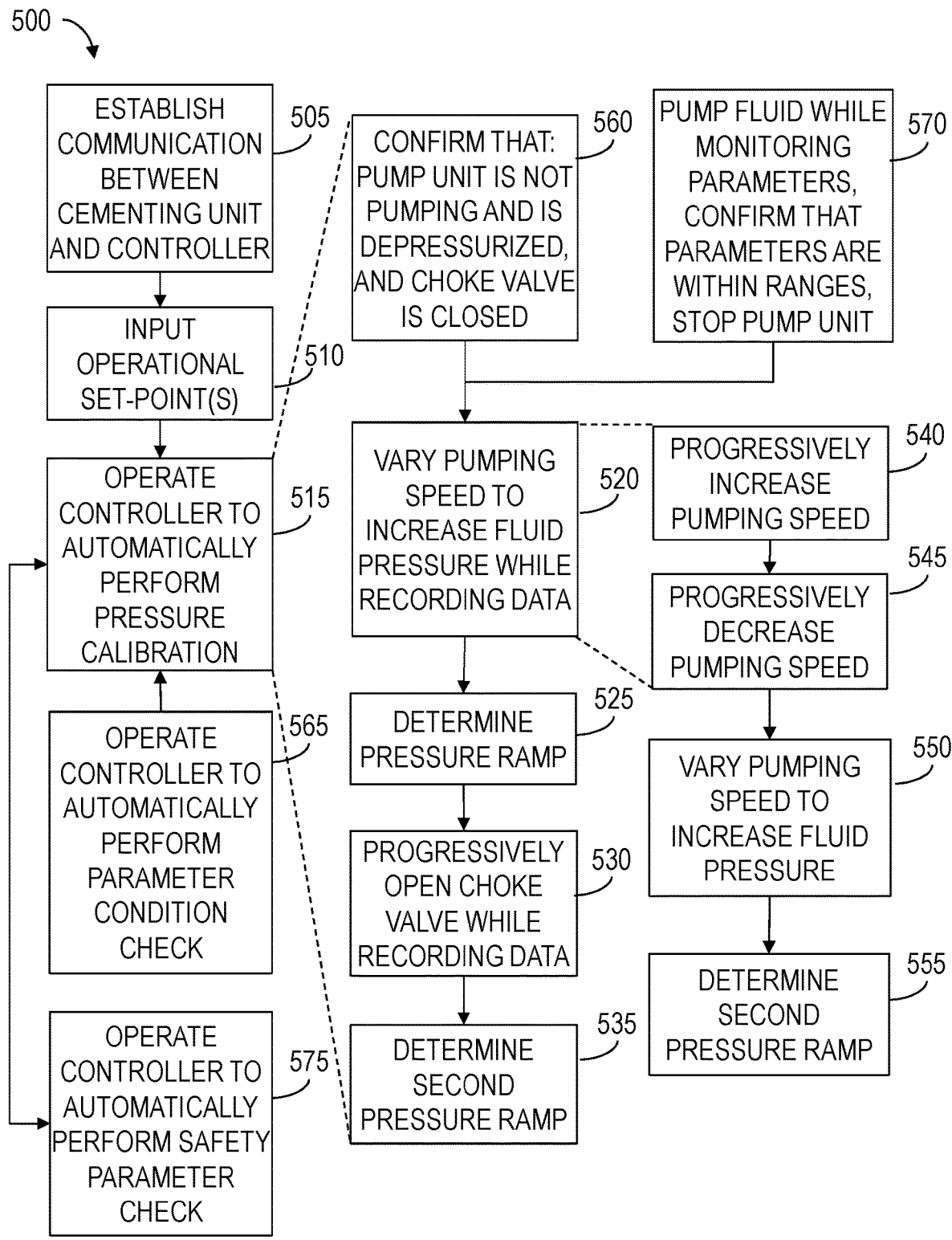
FIG. 6 is a flow-chart diagram of at least a portion of an example implementation of a method according to one or more aspects of the present disclosure.

FIG. 6 is a flow-chart diagram of at least a portion of an example implementation of a method (500) according to one or more aspects of the present disclosure. The method (500) may be performed utilizing or otherwise in conjunction with at least a portion of one or more implementations of one or more instances of the apparatus shown in one or more of FIGS. 1-5 and/or otherwise within the scope of the present disclosure. For example, the method (500) may be performed and/or caused, at least partially, by the controller 410 executing the coded instructions 432 according to one or more aspects of the present disclosure. Thus, the following description of the method (500) also refers to apparatus shown in one or more of FIGS. 1-5. However, the method (500) may also be performed in conjunction with implementations of apparatus other than those depicted in FIGS. 1-5 that are also within the scope of the present disclosure.

The method (500) may comprise establishing (505) communication between the cementing unit 200 and the controller 410. As described above, the controller 410 may be operable to control operation of the cementing unit 200, such as via operation of the processor 412, the memory 417, and the computer program code 432. The method (500) may further comprise inputting (510) into the controller 410 operational set-point(s), including a pressure set-point, such as may be utilized by the controller 410 to automatically perform a pressure calibration and/or other operation of the cementing unit 200. Such inputs (510) may be performed by a human operator via the input devices 426 described above, although the controller 410 may also be operable to retrieve the inputs as predetermined values/ranges included in the computer program code 432.

The method (500) may further comprise operating (515) the controller 410 to automatically perform the pressure calibration of the cementing unit 200. The pressure calibration may comprise automatically varying (520) pumping speed of a pump unit 300 of the cementing unit 200 to increase a fluid pressure generated by the pump unit 300 to the pressure set-point while recording the varying pumping speeds and corresponding fluid pressures. The pressure calibration (515) may further comprise determining (525) a pressure ramp relating the recorded pumping speeds and corresponding fluid pressures.

The pressure ramp may relate the recorded fluid pressure generated by the cementing unit 200 to the recorded pumping speed or operating rate of the cementing unit 200. The pressure ramp may be utilized as an estimate or projection of an actual fluid pressure with respect to the pumping speed during cement or other pumping operations. The pressure ramp may be utilized during the cement pumping operations or other pumping operations to control the pressure by controlling the pumping speed of the cementing unit 200. The pressure set-point may range, for example, between about 3,000 pounds per square inch (PSI) and about 4,000 PSI.

The method (500), wherein the pressure set-point is a first pressure set-point, the recorded pumping speeds are recorded first pumping speeds, and the recorded fluid pressures are recorded first fluid pressures. Inputting (510) the operational set-point(s) may further comprise inputting into the controller 410 a second pressure set-point, wherein the pressure calibration (515) further comprises, after determining the pressure ramp, progressively opening (530) a choke valve 252 of the cementing unit 200 downstream of the pump unit 300 while recording positions of the choke valve 252 and corresponding second fluid pressures until one of the recorded second fluid pressures substantially equals the second pressure set-point. The position of the choke valve 252 may be a measurement of an amount or percentage that the choke valve 252 is open with respect to the fully-open flow position.

The method (500), wherein the pressure ramp is a first pressure ramp. The pressure calibration (515) may further comprise, after opening (530) the choke valve 252, determining (535) a second pressure ramp relating the recorded second fluid pressures and corresponding choke valve positions. The second pressure ramp may relate the recorded fluid pressure generated by the cementing unit 200 to the recorded position of the choke valve 252. The pressure ramp may be utilized for estimating or projecting an actual rate of fluid pressure decrease with respect to the position of the choke valve 252 during cement or other pumping operations. For example, the second pressure ramp may be utilized during the cement pumping operations or other pumping operations to estimate time or rate at which the fluid pressure will decrease based on the position of the choke valve 252. In an example implementation, the second pressure set-point may range between about zero PSI and about 100 PSI.

Inputting (510) the operational set-point(s) may further comprise inputting into the controller 410 an incremental position set-point, wherein progressively opening (530) the choke valve 252 is via the incremental position set-point. In an example implementation, the incremental position set-points may range between about 1/20 turn and about 1/2 turn of the choke valve 252 for each pressure and pumping speed reading performed by the controller 410. The incremental position set-points may also range between about 1% and about 5% of the fully-open flow position of the choke valve 252 for each pressure and pumping speed reading performed by the controller 410.

Varying (520) the pumping speed may comprise progressively increasing (540) the pumping speed to a first speed and progressively decreasing (545) the pumping speed from the first speed to a second speed that is substantially zero. The fluid pressure may reach the pressure set-point while the pumping speed is increasing (540) or the fluid pressure may reach the pressure set-point while the pumping speed is decreasing 545.

Inputting (510) the operational set-point(s) may also comprise inputting into the controller 410 first and second incremental speed set-points, wherein progressively increasing (540) the pumping speed may be via the first incremental speed set-point, and wherein progressively decreasing (545) the pumping speed may be via the second incremental speed set-point. In an example implementation, the first and second incremental speed set-points may range between about one and about five revolutions per minute (RPM) for each pressure and pumping speed reading performed by the controller 410.

The method (500), wherein the pressure ramp is a first pressure ramp, the recorded pumping speeds are recorded first pumping speeds, and the recorded fluid pressures are recorded first fluid pressures. Inputting (510) the operational set-point(s) may further comprise inputting into the controller 410 a second pressure set-point, a first incremental percentage set-point that is a percentage of the second pressure set-point, and a second incremental percentage set-point that is a percentage of the second pressure set-point. The pressure calibration (515) may further comprise, after determining the first pressure ramp, varying (550) the pumping speed to increase the fluid pressure to the second pressure set-point while recording second pumping speeds and corresponding second fluid pressures and determining (555) a second pressure ramp relating the recorded second pumping speeds and second fluid pressures. Varying (550) the pumping speed to increase the fluid pressure to the second pressure set-point may comprise progressively increasing the pumping speed by a first amount that corresponds to the first incremental percentage set-point and that is based on the first pressure ramp and progressively decreasing the pumping speed by a second amount that corresponds to the second incremental percentage set-point and that is based on the first pressure ramp until the pumping speed is zero.

In an example implementation, the first and second incremental percentage set-points may each range between about 1% and about 10% of the pressure set-point. The second pressure set-point may range, for example, between about 4,000 PSI and about 15,000 PSI, whereby the first pressure set-point may range, for example, between about 20% and about 30% of the second pressure set-point.

The pressure calibration (515) may further comprise, before varying (520) the pumping speed, confirming (560) that the pump unit 300 is not pumping the fluid, confirming that the pump unit 300 is depressurized, and confirming that the choke valve 252 of the cementing unit 200 downstream of the pump unit 300 is closed. The controller 410 may confirm that the pump unit 300 has stopped via the rotary sensors 311. The controller 410 may confirm that the pump unit 300 is depressurized if the pressure detected by the pressure sensor 317 ranges, for example, between about zero PSI and about 100 PSI. Also, the controller 410 may confirm that the choke valve 252 is closed via the valve position sensor 260.

The cementing unit 200 may comprise a plurality of sensors 307, 309, 306, 319 operable to generate information indicative of operational parameters of the cementing unit 200, including the recorded pumping speeds and fluid pressures. The method (500) may further comprise, before operating (515) the controller 410 to automatically perform the pressure calibration, operating (565) the controller 410 to automatically perform a parameter condition check of the cementing unit 200. The parameter condition check (565) may comprise automatically monitoring ones of the operational parameters indicative of the cementing unit operational status based on the information generated by the sensors 307, 309, 306, 319 and confirming the monitored ones of the operational parameters are within corresponding predetermined ranges.

For example, the monitored ones of the operational parameters may be indicative of at least one of a temperature of the pump unit 300 and presence of moisture in association with the pump unit 300. If the temperature of the prime mover 304 is greater than, for example, 170° Celsius (° C.) or if the prime mover 304 is exposed to moisture, the pressure calibration (515) may be stopped. The controller 410 may also monitor functionality of the pump unit lubrication system 312 and/or the pump unit cooling system 305 by monitoring pressures generated by the pump unit lubrication system 312 and the pump unit cooling system 305 via the pressure sensors 319, 306, respectively.

The pressure calibration (515) may further comprise, before varying (520) the pumping speed, pumping (570) the fluid with the pump unit 300 while monitoring the pumping speed, fluid pressure, and fluid flow rate generated by the pump unit 300, confirming that the monitored pumping speed, fluid pressure, and fluid flow rate are within corresponding predetermined ranges, and decreasing the pumping speed until the pump unit 300 stops pumping fluid.

The cementing unit 200 may comprise the plurality of sensors 307, 309, 311, 317 operable to generate information indicative of operational parameters of the cementing unit 200, including the recorded pumping speeds and fluid pressures. The method (500) may further comprise operating (575) the controller 410 to automatically perform a safety parameter check of the cementing unit 200, comprising monitoring safety parameters based on the information generated by the sensors 307, 309, 311, 317 and confirming that the safety parameters are within corresponding predetermined ranges. The safety parameters may include pressure and temperature readings, which if exceeding the predetermined ranges, may cause the controller 410 to shut down the pressure calibration (515). For example, a predetermined threshold of safety related to the prime mover 304 may be a temperature exceeding 170° C. A predetermined threshold of safety related to the pump unit 300 may be a pressure exceeding 20,000 PSI or another pressure exceeding pump unit specifications. A sudden pressure drop detected, for example, within the pump unit 300 and/or the manifold 270 may be indicative of a leak or structural failure and may also cause the controller 410 to shut down the pressure calibration (515). The safety parameter check (575) may be performed before, during, and/or after the pressure calibration (515), the confirmation (560) operation, the parameter condition check (565), the pumping (570) operation, and/or other operations of the cementing unit 200.

Figure 7:
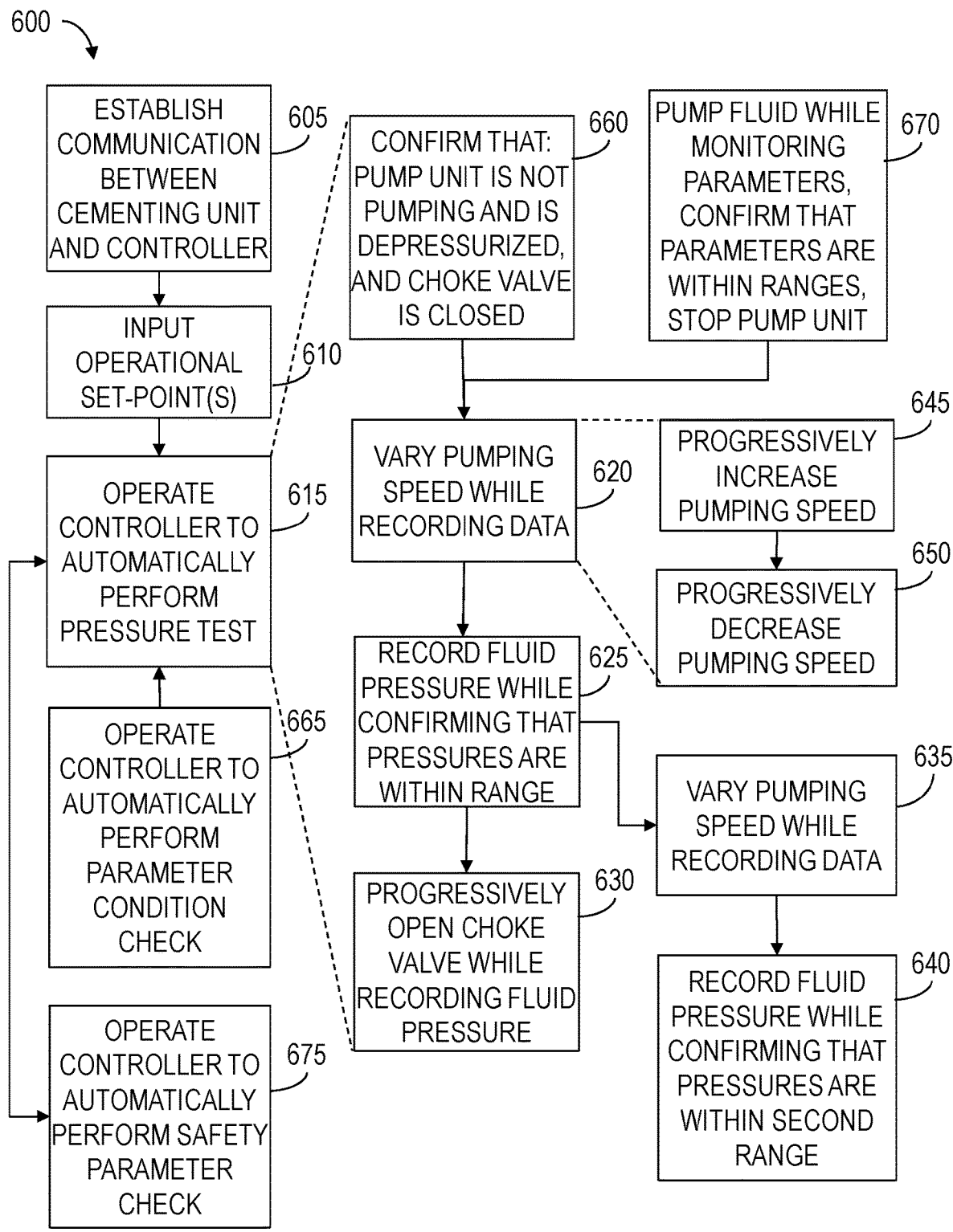
FIG. 7 is a flow-chart diagram of at least a portion of an example implementation of a method according to one or more aspects of the present disclosure.

FIG. 7 is a flow-chart diagram of at least a portion of an example implementation of another method (600) according to one or more aspects of the present disclosure. The method (600) may be performed utilizing or otherwise in conjunction with at least a portion of one or more implementations of one or more instances of the apparatus shown in one or more of FIGS. 1-5 and/or otherwise within the scope of the present disclosure. For example, the method (600) may be performed and/or caused, at least partially, by the controller 410 executing the coded instructions 432 according to one or more aspects of the present disclosure. Thus, the following description of the method (600) also refers to apparatus shown in one or more of FIGS. 1-5. However, the method (600) may also be performed in conjunction with implementations of apparatus other than those depicted in FIGS. 1-5 that are also within the scope of the present disclosure.

The method (600) may comprise establishing (605) communication between the cementing unit 200 and the controller 410. As described above, the controller 410 may be operable to control operation of the cementing unit 200, such as via operation of the processor 412, the memory 417, and the computer program code 432. The method (600) may further comprise inputting (610) into the controller 410 operational set-point(s), including a pressure set-point and a test duration set-point, such as may be utilized by the controller 410 to automatically perform a pressure test and/or other operation of the cementing unit 200. Such inputs (610) may be performed by the human operator via the input devices 426 described above, although the controller 410 may also be operable to retrieve the inputs as predetermined values/ranges included in the computer program code 432.

The method (600) may further comprise operating (615) the controller 410 to automatically perform the pressure test of the cementing unit 200. The pressure test (615) may comprise automatically varying (620) a pumping speed of a pump unit 300 of the cementing unit 200 to increase a fluid pressure generated by the pump unit 300 to the pressure set-point while recording the varying pumping speeds and corresponding first fluid pressures, wherein the recorded first fluid pressures are detected within a fluid conduit 234, 235, 236 of the cementing unit 200 downstream of the pump unit 300. The pressure test (615) may further comprise recording (625) second fluid pressures within the fluid conduit 234, 235, 236 until the test duration set-point is met while confirming that the recorded second fluid pressures are within a predetermined range of the pressure set-point.

In an example implementation, the pressure set-point may range between about 500 PSI and about 5,000 PSI for a low pressure test, and between about 5,000 PSI and about 15,000 PSI for a high pressure test. The test duration set-point may be a predetermined amount of time during which at least a portion of a test or operation of the cementing unit 200, such as the pressure test, may be performed. The test duration set-point may range, for example, between about five minutes and about fifteen minutes. Also, the predetermined range of the pressure set-point may comprise, for example, between about 1% and about 5% of the pressure set-point.

The method (600), wherein the pressure set-point is a first pressure set-point. Inputting (610) the operational set-point(s) may comprise inputting into the controller 410 a second pressure set-point, wherein the pressure test (615) may further comprise, after the duration set-point is met, progressively opening (630) the choke valve 252 of the cementing unit 200 downstream of the pump unit 300 while recording the fluid pressures within the fluid conduit 234, 235, 236 until one of the recorded third fluid pressures is substantially equal to the second pressure set-point. In an example implementation, the second pressure set-point may range between about zero PSI and about 100 PSI.

Inputting (610) the operational set-point(s) may further comprise inputting into the controller 410 an incremental position set-point, wherein progressively opening (630) the choke valve 252 is via the incremental position set-point. Inputting (610) the operational set-point(s) may also comprise inputting into the controller 410 an incremental percentage set-point of a fully-open flow position, wherein progressively opening (630) the choke valve 252 is via the incremental percentage set-point.

In an example implementation, the incremental position set-points may range between about ½₀ turn and about ½ turn of the choke valve 252 for each pressure and pumping speed reading performed by the controller 410. The first and second incremental percentage position set-points may range, for example, between about 1% and about 5% of the fully-open flow position of the choke valve 252 for each pressure and pumping speed recording performed by the controller 410.

The method (600), wherein the pressure set-point is a first pressure set-point, the recorded pumping speeds are recorded first pumping speeds, the test duration set-point is a first test duration set-point, and the predetermined range is a first predetermined range. Inputting (610) the operational set-point(s) may also comprise inputting into the controller 410 a second pressure set-point and a second test duration set-point. The pressure test (615) may further comprise, after the first test duration set-point is met, varying (635) the pumping speed to increase the fluid pressure to the second pressure set-point while recording second pumping speeds and corresponding third fluid pressures and recording (640) fourth fluid pressures until the second test duration set-point is met while confirming that the recorded fourth fluid pressures are within a second predetermined range of the second pressure set-point.

In an example implementation, the second pressure set-point may exceed the first pressure set-point by a pressure ranging between about 5% and about 15% of the first pressure set-point, while the second test duration set-point may range between about one minute and about five minutes. The second predetermined range of the second pressure set-point may comprise, for example, between about 1% and about 5% of the second pressure set-point.

Varying (620) the pumping speed may comprise progressively increasing (645) the pumping speed to a first speed and progressively decreasing (650) the pumping speed from the first speed to a second speed that is substantially zero.

Inputting (610) the operational set-point(s) may comprise inputting into the controller 410 first and second incremental speed set-points, wherein progressively increasing (645) the pumping speed is via the first incremental speed set-point, and wherein progressively decreasing (650) the pumping speed is via the second incremental speed set-point. For example, the first and second incremental speed set-points may range between about one and about five RPM for each pressure and pumping speed recording performed by the controller 410.

Inputting (610) the operational set-point(s) may further comprise inputting into the controller 410 first and second incremental percentage set-points that are corresponding percentages of the pressure set-point, wherein progressively increasing (645) the pumping speed is based on the first incremental percentage set-point, and wherein progressively decreasing (650) the pumping speed is based on the second incremental percentage set-point. In an example implementation, the first and second incremental percentage set-points may each range between about 1% and about 10% of the pressure set-point for each pressure and pumping speed recording performed by the controller 410.

The pressure test (615) may further comprise, before varying (620) the pumping speed, confirming (660) that the pump unit 300 is not pumping the fluid, that the pump unit 300 is depressurized, and that the choke valve 252 of the cementing unit 200 downstream of the pump unit 300 is closed. The confirming (660) operations may be performed similarly to the confirming (560) operations described above.

The cementing unit 200 may comprise a plurality of sensors 307, 309, 306, 319 operable to generate information indicative of operational parameters of the cementing unit 200. The method (600) may further comprise, before operating (615) the controller 410 to automatically perform the pressure test, operating (665) the controller 410 to automatically perform a parameter condition check of the cementing unit 200. The parameter condition check (665) may be performed similarly to the parameter condition check (565) described above.

The pressure test (615) may further comprise, before increasing (620) the pumping speed, pumping (670) the fluid with the pump unit 300 while monitoring the pumping speed, fluid pressure, and fluid flow rate generated by the pump unit 300, confirming that the monitored pumping speed, fluid pressure, and fluid flow rate are within corresponding predetermined ranges, and decreasing the pumping speed until the pump unit 300 stops pumping the fluid.

The cementing unit 200 may comprise the plurality of sensors 307, 309, 311, 317 operable to generate information indicative of operational parameters of the cementing unit 200. The method (600) may further comprise operating (675) the controller 410 to automatically perform a safety parameter check of the cementing unit 200, comprising monitoring safety parameters based on the information generated by the sensors 307, 309, 311, 317 and confirming the safety parameters are within corresponding predetermined ranges. The safety parameter check (675) may be performed similarly to the safety parameter check (575) described above. The safety parameter check (575) may be performed before, during, and/or after the pressure test (615), the confirmation (660) operation, the parameter condition check (665), the pumping (670) operation, and/or other operations of the cementing unit 200.

Figure 8:
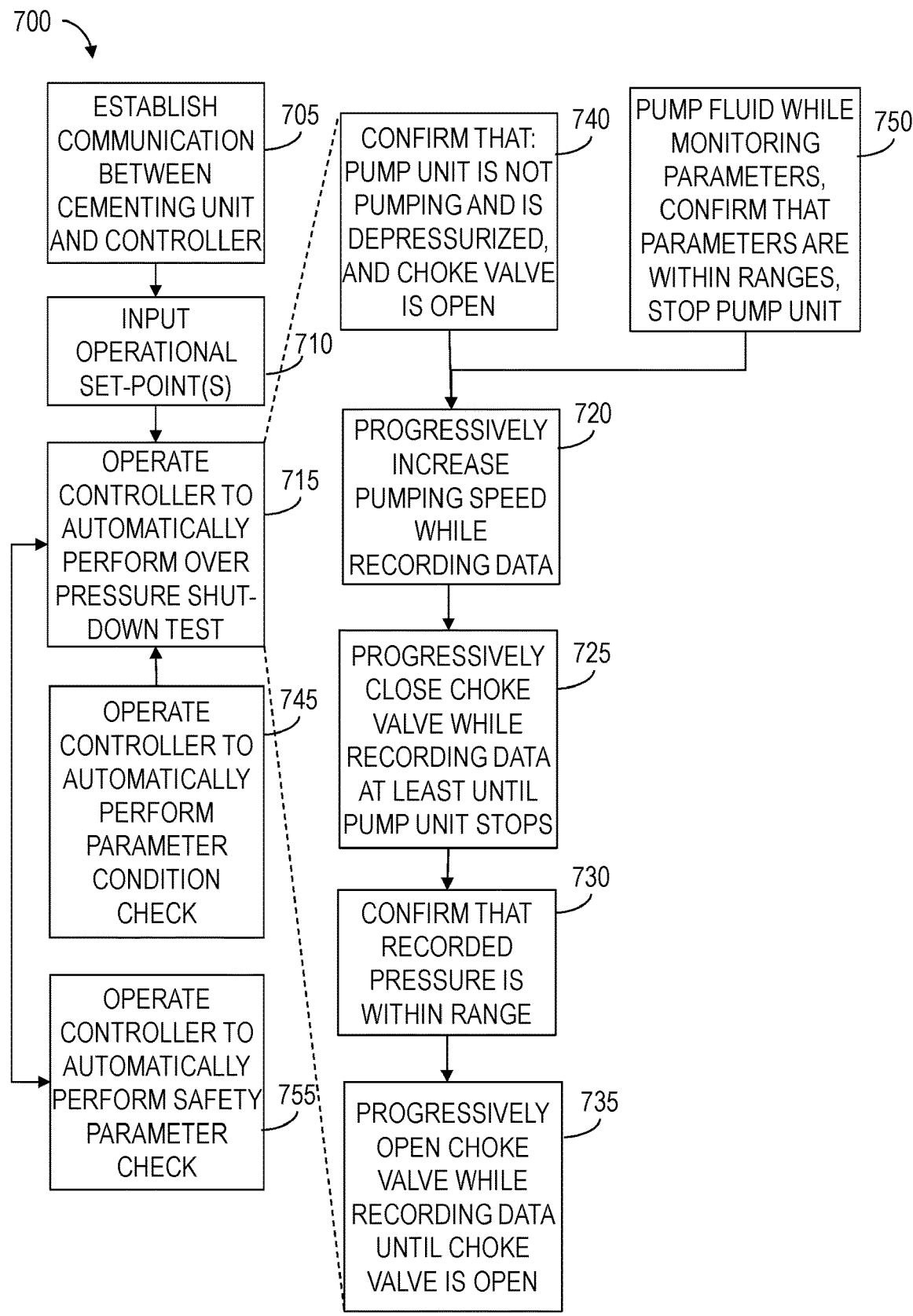
FIG. 8 is a flow-chart diagram of at least a portion of an example implementation of a method according to one or more aspects of the present disclosure.

FIG. 8 is a flow-chart diagram of at least a portion of an example implementation of another method (700) according to one or more aspects of the present disclosure. The method (700) may be performed utilizing or otherwise in conjunction with at least a portion of one or more implementations of one or more instances of the apparatus shown in one or more of FIGS. 1-5 and/or otherwise within the scope of the present disclosure. For example, the method (700) may be performed and/or caused, at least partially, by the controller 410 executing the coded instructions 432 according to one or more aspects of the present disclosure. Thus, the following description of the method (700) also refers to apparatus shown in one or more of FIGS. 1-5. However, the method (700) may also be performed in conjunction with implementations of apparatus other than those depicted in FIGS. 1-5 that are also within the scope of the present disclosure.

The method (700) may comprise establishing (705) communication between the cementing unit 200 and the controller 410. As described above, the controller 410 may be operable to control operation of the cementing unit 200, such as via operation of the processor 412, the memory 417, and the computer program code 432. The method (700) may further comprise inputting (710) into the controller 410 operational set-point(s), including a pumping speed set-point, such as may be utilized by the controller 410 to automatically perform an over pressure shut-down test and/or other operation of the cementing unit 200. Such inputs (710) may be performed by the human operator via the input devices 426 described above, although the controller 410 may also be operable to retrieve the inputs as predetermined values/ranges included in the computer program code 432.

The method (700) may also comprise operating (715) the controller 410 to automatically perform the over pressure shut-down test of the cementing unit 200. The over pressure shut-down test (715) may comprise automatically, while a choke valve 252 of the cementing unit 200 downstream of a pump unit 300 of the cementing unit 200 is at least partially open, progressively increasing (720) a pumping speed of the pump unit 300 while recording the varying pumping speeds and corresponding first fluid pressures until one of the recorded pumping speeds substantially equals the pumping speed set-point. The over pressure shut-down test (715) may further comprise progressively closing (725) the choke valve 252 while recording positions of the choke valve 252 and corresponding second fluid pressures at least until the pump unit 300 automatically stops pumping in response to over-pressurization, and then confirming (730) that one of the recorded second fluid pressures associated with the automatic pump unit stoppage is within a predetermined range of the pressure set-point.

In an example implementation, the pumping speed set-point may range between about 1,000 RPM and about 2,000 RPM, while the pressure set-point may range, for example, between about 500 PSI and about 1,500 PSI. The predetermined range may range, for example, between about 1% and about 10% of the pressure set-point.

The method (700), wherein the recorded choke valve positions are recorded first choke valve positions. The over-pressure shut-down test (715) may further comprise, after progressively closing (725) the choke valve 252, progressively opening (735) the choke valve 252 while recording second choke valve positions and corresponding third fluid pressures until the choke valve 252 is in a fully-open position.

Inputting (710) the operational set-point(s) may comprise inputting into the controller 410 an incremental speed set-point, wherein progressively increasing (720) the pumping speed is via the incremental speed set-point. Inputting (710) the operational set-point(s) may further comprise inputting into the controller 410 an incremental position set-point, wherein progressively closing (725) the choke valve 252 is via the incremental position set-point.

In an example implementation, the incremental speed set-point may range between about one and about five RPM for each pressure and pumping speed reading performed by the controller 410. The incremental position set-points may range between about 1% and about 5% of the fully-open flow position of the choke valve 252 for each pressure and pumping speed reading performed by the controller 410.

The over pressure shut-down test (715) may further comprise, before progressively increasing (720) the pumping speed, confirming (740) that the pump unit 300 is not pumping the fluid, that the pump unit 300 is depressurized, and that the choke valve 252 of the cementing unit 200 downstream of the pump unit 300 is open. The confirming (740) operations may be performed similarly to the confirming (560) operations described above.

The cementing unit 200 may comprise the plurality of sensors 307, 309, 306, 319 operable to generate information indicative of operational parameters of the cementing unit 200. The method (700) may further comprise, before operating (715) the controller 410 to automatically perform the over pressure shut-down test, operating (745) the controller 410 to automatically perform a parameter condition check of the cementing unit 200. The parameter condition check (745) may be performed similarly to the parameter condition check (565) described above.

The over pressure shut-down test (715) may further comprise, before progressively increasing (720) the pumping speed, pumping (750) the fluid with the pump unit 300 while monitoring the pumping speed, fluid pressure, and fluid flow rate generated by the pump unit 300, confirming that the monitored pumping speed, fluid pressure, and fluid flow rate are within corresponding predetermined ranges, and decreasing the pumping speed until the pump unit 300 stops pumping the fluid.

The cementing unit 200 may comprise the plurality of sensors 307, 309, 311, 317 operable to generate information indicative of operational parameters of the cementing unit 200. The method (700) may further comprise operating (755) the controller 410 to automatically perform a safety parameter check of the cementing unit 200, comprising monitoring safety parameters based on the information generated by the sensors 307, 309, 311, 317 and confirming the safety parameters are within corresponding predetermined ranges. The safety parameter check (755) may be performed similarly to the safety parameter check (575) described above. The safety parameter check (755) may be performed before, during, and/or after the over pressure shut-down test (715), the confirmation (740) operation, the parameter condition check (745), the pumping (750) operation, and/or other operations of the cementing unit 200.

Figure 9:
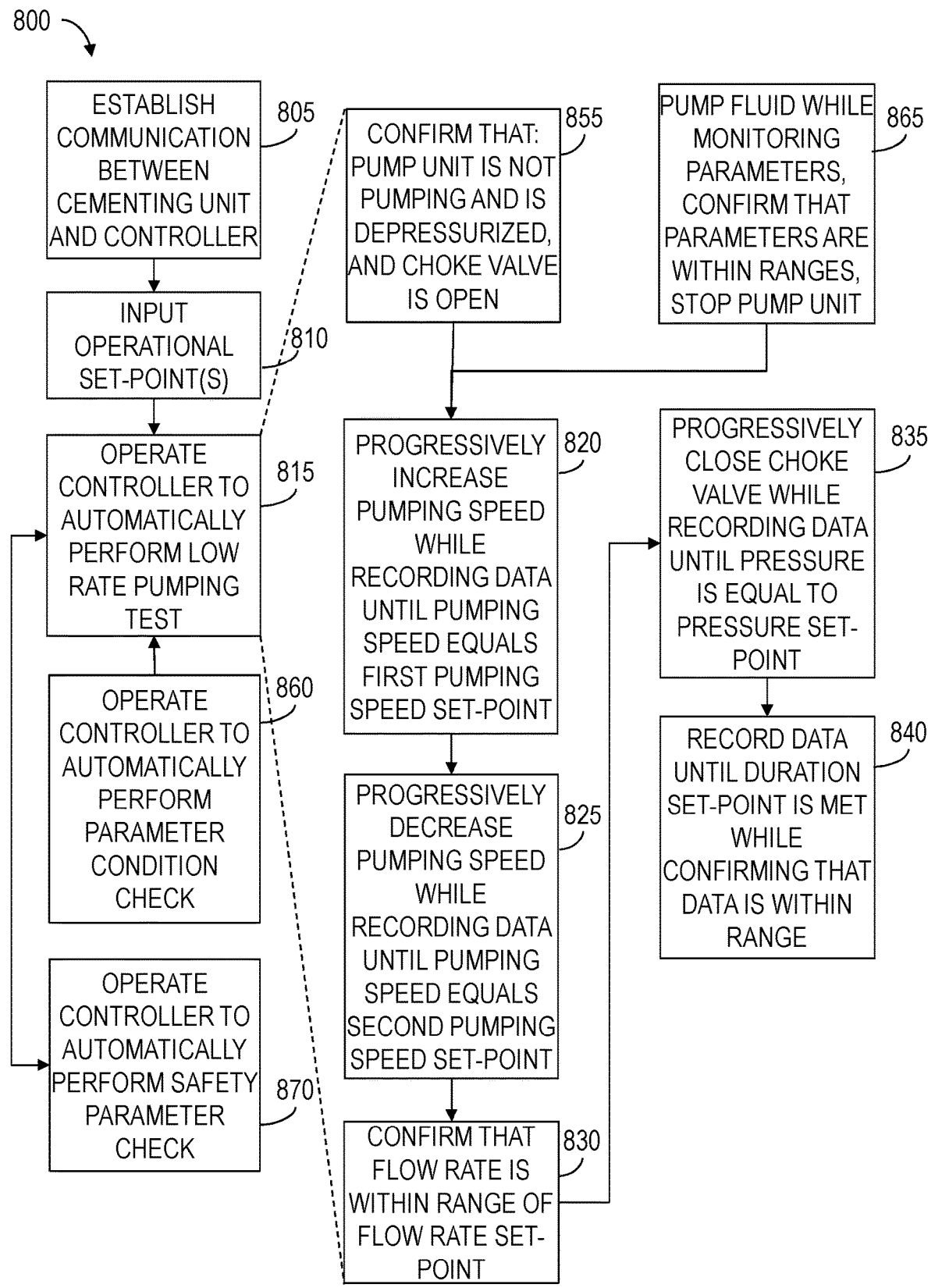
FIG. 9 is a flow-chart diagram of at least a portion of an example implementation of a method according to one or more aspects of the present disclosure.

FIG. 9 is a flow-chart diagram of at least a portion of an example implementation of another method (800) according to one or more aspects of the present disclosure. The method (800) may be performed utilizing or otherwise in conjunction with at least a portion of one or more implementations of one or more instances of the apparatus shown in one or more of FIGS. 1-5 and/or otherwise within the scope of the present disclosure. For example, the method (800) may be performed and/or caused, at least partially, by the controller 410 executing the coded instructions 432 according to one or more aspects of the present disclosure. Thus, the following description of the method (800) also refers to apparatus shown in one or more of FIGS. 1-5. However, the method (800) may also be performed in conjunction with implementations of apparatus other than those depicted in FIGS. 1-5 that are also within the scope of the present disclosure.

The method (800) may comprise establishing (805) communication between the cementing unit 200 and the controller 410. As described above, the controller 410 may be operable to control operation of the cementing unit 200, such as via operation of the processor 412, the memory 417, and the computer program code 432. The method (800) may further comprise inputting (810) into the controller 410 operational set-point(s), including a first pumping speed set-point, a second pumping speed set-point, and a flow rate set-point, wherein the second pumping speed set-point is at least 10% of the first pumping speed set-point, such as may be utilized by the controller 410 to automatically perform a low rate pumping test and/or other operation of the cementing unit 200. Such inputs (810) may be performed by the human operator via the input devices 426 described above, although the controller 410 may also be operable to retrieve the inputs as predetermined values/ranges included in the computer program code 432.

The method (800) may also comprise operating (815) the controller 410 to automatically perform the low rate pumping test of the cementing unit 200. The low rate pumping test (815) may comprise automatically progressively increasing (820) pumping speed of a pump unit 300 of the cementing unit 200 while recording first pumping speeds and corresponding first fluid flow rates generated by the pump unit 300 until one of the recorded first pumping speeds substantially equals the first pumping speed set-point, and progressively decreasing (825) the pumping speed from the first pumping speed set-point while recording second pumping speeds and corresponding second fluid flow rates until one of the recorded second pumping speeds substantially equals the second pumping speed set-point. The low rate pumping test (815) may further comprise confirming (830) that one of the recorded second fluid flow rates corresponding to the one of the recorded second pumping speeds is within a predetermined range of the flow rate set-point.

In an example implementation, the first pumping speed set-point may range between about 1,000 RPM and about 2,000 RPM and the second pumping speed set-point may range between about 50 RPM and about 150 RPM. The flow rate set-point may range, for example, between about 0.2 barrels per minute (BPM) and about 0.5 BPM. The predetermined range of the flow rate set-point may range, for example, between about 0.01 BPM and about 0.05 BPM from the flow rate set-point.

The low rate pumping test (815) may also comprise recording first fluid pressures corresponding to the recorded first pumping speeds while progressively increasing (820) the pumping speed and recording second fluid pressures corresponding to the recorded second pumping speeds while progressively decreasing (825) the pumping speed.

Inputting (810) the operational set-point(s) may further comprise inputting into the controller 410 a pressure set-point and a test duration set-point, wherein the low rate pumping test (815) may further comprise progressively closing (835) a choke valve 252 of the cementing unit 200 downstream of the pump unit 300 while recording positions of the choke valve 252 and corresponding first fluid pressures and third fluid flow rates generated by the pump unit 300 until one of the recorded first fluid pressures is substantially equal to the pressure set-point, and then recording (840) second fluid pressures and corresponding fourth fluid flow rates until the test duration set-point is met while confirming that the recorded second fluid pressures and fourth fluid flow rates are within predetermined corresponding ranges of the pressure set-point and the flow rate set-point.

In an example implementation, the pressure set-point may range between about 2,500 PSI and about 7,500 PSI and the second test duration set-point may range between about five minutes and about thirty minutes. The predetermined range of the pressure set-point may range, for example, between about 1% and about 5% of the pressure set-point.

The low rate pumping test (815) may further comprise, after the test duration set-point is met, decreasing the pumping speed of the pump unit 300 until the pump unit 300 stops pumping the fluid. The low rate pumping test (815) may also comprise, after the test duration set-point is met, opening the choke valve 252 while recording positions of the choke valve 252 until the choke valve 252 is in the fully-open flow position.

The low rate pumping test (815) may further comprise, before progressively increasing (820) the pumping speed, confirming (855) that the pump unit 300 is not pumping the fluid, that the pump unit 300 is depressurized, and that the choke valve 252 of the cementing unit 200 downstream of the pump unit 300 is open. The confirming (855) operations may be performed similarly to the confirming (560) operations described above.

The cementing unit 200 may comprise the plurality of sensors 307, 309, 306, 319 operable to generate information indicative of operational parameters of the cementing unit 200. The method (800) may further comprise, before operating (815) the controller 410 to automatically perform the low rate pumping test, operating (860) the controller 410 to automatically perform a parameter condition check of the cementing unit 200. The parameter condition check (860) may be performed similarly to the parameter condition check (565) described above.

The low rate pumping test (815) may further comprise, before progressively increasing (820) the pumping speed, pumping (865) the fluid with the pump unit 300 while monitoring the pumping speed, fluid pressure, and fluid flow rate generated by the pump unit 300, confirming that the monitored pumping speed, fluid pressure, and fluid flow rate are within corresponding predetermined ranges, and decreasing the pumping speed until the pump unit 300 stops pumping the fluid.

The cementing unit 200 may comprise the plurality of sensors 307, 309, 311, 317 operable to generate information indicative of operational parameters of the cementing unit 200. The method (800) may further comprise operating (870) the controller 410 to automatically perform a safety parameter check of the cementing unit 200, comprising monitoring safety parameters based on the information generated by the sensors 307, 309, 311, 317 and confirming the safety parameters are within corresponding predetermined ranges. The safety parameter check (870) may be performed similarly to the safety parameter check (575) described above. The safety parameter check (870) may be performed before, during, and/or after the low rate pumping test (815), the confirmation (855) operation, the parameter condition check (860), the pumping (865) operation, and/or other operations of the cementing unit 200.

Figure 10:
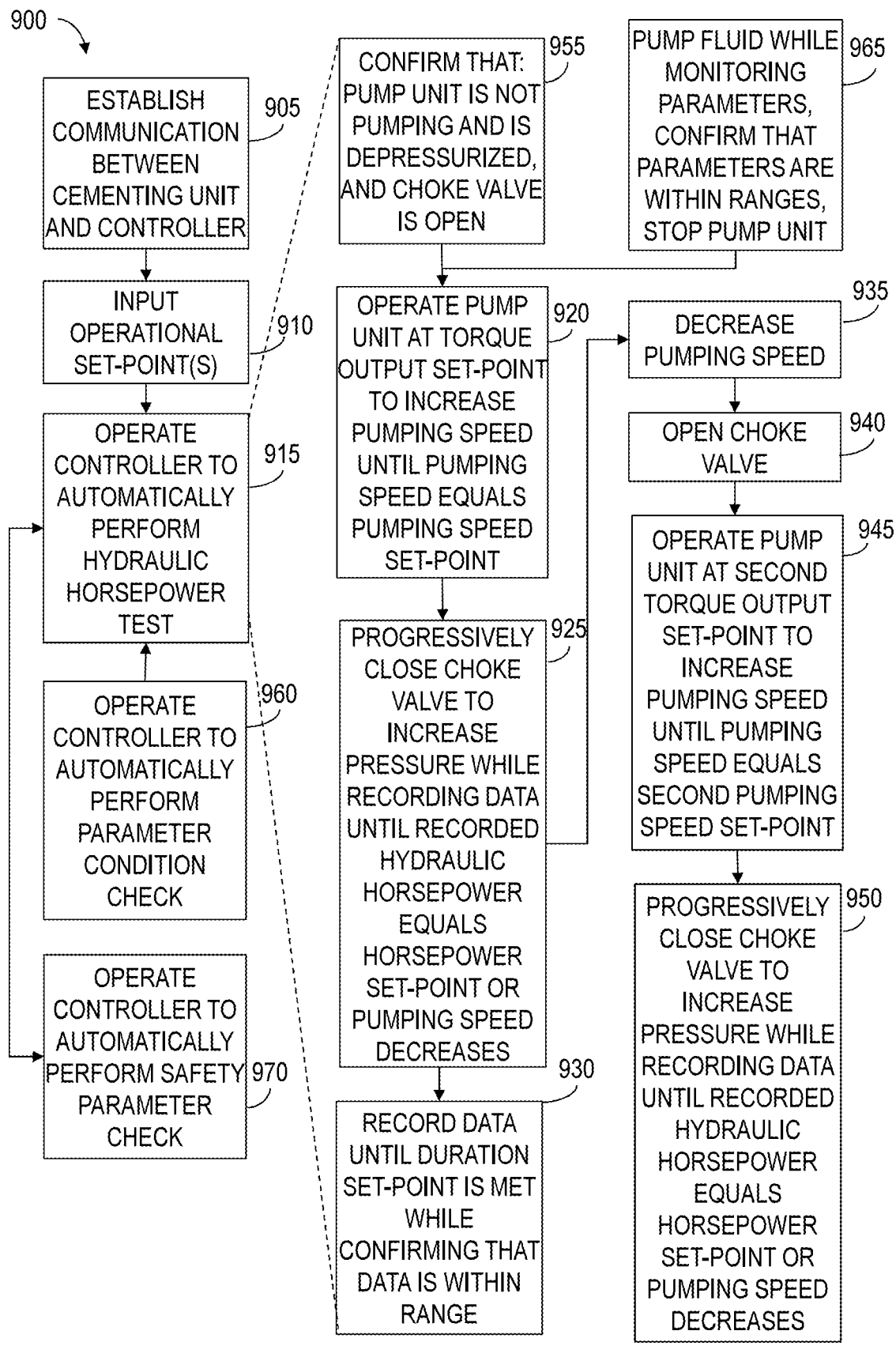
FIG. 10 is a flow-chart diagram of at least a portion of an example implementation of a method according to one or more aspects of the present disclosure.

FIG. 10 is a flow-chart diagram of at least a portion of an example implementation of another method (900) according to one or more aspects of the present disclosure. The method (900) may be performed utilizing or otherwise in conjunction with at least a portion of one or more implementations of one or more instances of the apparatus shown in one or more of FIGS. 1-5 and/or otherwise within the scope of the present disclosure. For example, the method (900) may be performed and/or caused, at least partially, by the controller 410 executing the coded instructions 432 according to one or more aspects of the present disclosure. Thus, the following description of the method (900) also refers to apparatus shown in one or more of FIGS. 1-5. However, the method (900) may also be performed in conjunction with implementations of apparatus other than those depicted in FIGS. 1-5 that are also within the scope of the present disclosure.

The method (900) may comprise establishing (905) communication between the cementing unit 200 and the controller 410. As described above, the controller 410 may be operable to control operation of the cementing unit 200, such as via operation of the processor 412, the memory 417, and the computer program code 432. The method (900) may further comprise inputting (910) into the controller 410 operational set-point(s), including a torque output set-point, a horsepower set-point, and a pumping speed set-point, such as may be utilized by the controller 410 to automatically perform a hydraulic horsepower test and/or other operation of the cementing unit 200. Such inputs (910) may be performed by the human operator via the input devices 426 described above, although the controller 410 may also be operable to retrieve the inputs as predetermined values/ranges included in the computer program code 432.

The method (900) may also comprise operating (915) the controller 410 to automatically perform the hydraulic horsepower test of the cementing unit 200. The hydraulic horsepower test (915) comprises automatically operating (920) a pump unit 300 of the cementing unit 200 at the torque output set-point to increase pumping speed of the pump unit 300 while recording first pumping speeds and corresponding first fluid pressures and first fluid flow rates generated by the pump unit 300 until one of the recorded first pumping speeds substantially equals the pumping speed set-point. The hydraulic horsepower test (915) may further comprise progressively closing (925) a choke valve of the cementing unit 200 downstream of the pump unit 300 to increase the fluid pressure generated by the pump unit 300 while recording second pumping speeds and corresponding second fluid pressures and second fluid flow rates, and hydraulic horsepower values of the pump unit based on the recorded second fluid pressures and second fluid flow rates. Closing (925) the choke valve 252 may be performed until one of the recorded hydraulic horsepower values substantially equals the horsepower set-point (which may indicate a successful hydraulic horsepower test (915)), or one of the recorded second pumping speeds is less than the pumping speed set-point by a predetermined amount (which may indicate a failed hydraulic horsepower test (915)).

The torque output set-point may comprise an intended maximum torque output setting of the pump unit 300 at which the hydraulic horsepower test is intended to be conducted, such as, for example, 25%, 33%, 68%, and 92% of the maximum torque setting of the pump unit 300. The pumping speed set-point may range, for example, between about 250 RPM and about 2,500 RPM. The horsepower set-point may be or comprise a hydraulic horsepower value derived or otherwise determined from a hydraulic horsepower output curve or a database indicative of operational characteristics of the pump unit 300. The hydraulic horsepower output curve or database may be provided by a manufacturer of the pump unit 300 and may indicate an expected hydraulic horsepower output of a healthy pump unit corresponding to an output or operating torque setting and a pumping speed of the healthy pump unit. In other words, the hydraulic horsepower output curve or database may provide an expected maximum hydraulic horsepower output, fluid flow rate, and/or maximum fluid pressure generated by the healthy pump unit 300 based on the maximum torque set-point and the pumping speed set-point. For example, at 25% maximum torque set-point and a pumping speed set-point of about 2,100 RPM, the pump unit 300 is expected to generate a flow rate of about 5.8 BPM, a pressure of about 3,675 PSI, and hydraulic power of about 522 horsepower.

The hydraulic horsepower test (915) may be considered as successful if, for example, the recorded hydraulic horsepower equals or exceeds the horsepower set-point or is within 10% of the horsepower set-point. The hydraulic horsepower test (915) may be considered as failed if, for example, the maximum recorded hydraulic horsepower is more than 10% lower than the horsepower set-point and/or if, for example, the pumping speed of the pump unit 300 decreases with respect to the pumping speed set-point by more than a predetermined pumping speed, which may range between about fifty RPM and about 200 RPM.

Inputting (910) the operational set-point(s) may further comprise inputting into the controller 410 a test duration set-point, a pressure set-point, and a flow rate set-point, wherein the hydraulic horsepower test (915) further comprises, after stopping further closure of the choke valve 252, recording (930) third fluid pressures and third fluid flow rates until the test duration set-point is met while confirming that the recorded third fluid pressures and third fluid flow rates do not decrease more than corresponding predetermined amounts from the pressure set-point and flow rate set-point, respectively.

As described above, the pressure set-point and the flow rate set-point may be based on the hydraulic horsepower output curve or database for the pump unit 300. The test duration set-point may range between about five minutes and about thirty minutes. The hydraulic horsepower test (915) may be considered as successful if, for example, the recorded fluid pressure and/or the recorded fluid flow rate are within 10% of the pressure and flow rate set-points.

The hydraulic horsepower test (915) may further comprise, after stopping further closure of the choke valve 252, decreasing (935) the pumping speed of the pump unit 300 to substantially zero, and then fully opening (940) the choke valve 252 until the choke valve 252 is in the fully-open flow position.

The method (900), wherein the torque output set-point is a first torque output set-point, the pumping speed set-point is a first pumping speed set-point, and the hydraulic horsepower values are first hydraulic horsepower values. Inputting (910) the operational set-point(s) may further comprise inputting into the controller 410 a second torque output set-point substantially greater than the first torque output set-point and a second pumping speed set-point substantially less than the first pumping speed set-point. The hydraulic horsepower test (915) may further comprise, after fully opening (940) the choke valve 252, operating (945) the pump unit 300 at the second torque output set-point to increase the pumping speed while recording third pumping speeds and corresponding third fluid pressures and third fluid flow rates until one of the recorded third pumping speeds substantially equals the second pumping speed set-point, then progressively closing (950) the choke valve 252 to increase the fluid pressure generated by the pump unit 300 while recording fourth pumping speeds and corresponding fourth fluid pressures and fourth fluid flow rates and second hydraulic horsepower values based on the recorded fourth fluid pressures and fourth fluid flow rates. Progressively closing (950) the choke valve 252 may be performed until one of the recorded second hydraulic horsepower values substantially equals the horsepower set-point, or one of the recorded fourth pumping speeds is less than the second pumping speed set-point by a predetermined amount.

The second torque output set-point may comprise an intended maximum torque output setting of the pump unit 300 that is substantially greater than the first torque output set-point. For example, if the first torque output set-point is 25% of the maximum torque set-point of the pump unit 300, the second torque output set-point may be, for example, 33%, 68%, or 92% of the maximum torque set-point. The second pumping speed set-point may comprise a corresponding pumping speed that is substantially smaller than the first pumping speed set-point. For example, if the first pumping speed set-point is 2100 RPM, the second pumping speed set-point may be about 1,450 RPM. As described above, the horsepower set-point may be or comprise a hydraulic horsepower value based on a hydraulic horsepower output curve or a database.

Similarly as described above, the hydraulic horsepower test (915) comprising the operation (945) of the pump unit 300 and progressively closing (950) the choke valve 252, may be considered as successful if, for example, the recorded second hydraulic horsepower equals or exceeds the horsepower set-point or is within 10% of the horsepower set-point. The hydraulic horsepower test (915) may be considered as failed if, for example, the recorded second hydraulic horsepower is more than 10% lower than the horsepower set-point and/or if, for example, the recorded fourth pumping speed of the pump unit 300 decreases with respect to the second pumping speed set-point by more than the predetermined pumping speed, which may range between about fifty RPM and about 200 RPM.

The hydraulic horsepower test (915) may further comprise, before operating (920) the pump unit 300, confirming (955) that the pump unit 300 is not pumping the fluid, that the pump unit 300 is depressurized, and that the choke valve 252 of the cementing unit 200 downstream of the pump unit 300 is open. The confirming (955) operations may be performed similarly to the confirming (560) operations described above.

The cementing unit 200 may comprise the plurality of sensors 307, 309, 306, 319 operable to generate information indicative of operational parameters of the cementing unit 200. The method (900) may further comprise, before operating (915) the controller to perform the hydraulic horsepower test, operating (960) the controller 410 to automatically perform a parameter condition check of the cementing unit 200. The parameter condition check (960) may be performed similarly to the parameter condition check (565) described above.

The hydraulic horsepower test (915) may further comprise, before operating the pump unit (920), pumping (965) the fluid with the pump unit 300 while monitoring the pumping speed, fluid pressure, and fluid flow rate generated by the pump unit 300, confirming that the monitored pumping speed, fluid pressure, and fluid flow rate are within corresponding predetermined ranges, and decreasing the pumping speed until the pump unit 300 stops pumping the fluid.

The cementing unit 200 may comprise the plurality of sensors 307, 309, 311, 317 operable to generate information indicative of operational parameters of the cementing unit 200. The method (900) may further comprise operating (970) the controller 410 to automatically perform a safety parameter check of the cementing unit 200, comprising monitoring safety parameters based on the information generated by the sensors 307, 309, 311, 317 and confirming the safety parameters are within corresponding predetermined ranges. The safety parameter check (970) may be performed similarly to the safety parameter check (575) described above. The safety parameter check (870) may be performed before, during, and/or after the over hydraulic horsepower test (915), the confirmation (955) operation, the parameter condition check (960), the pumping (965) operation, and/or other operations of the cementing unit 200.

Figure 11:
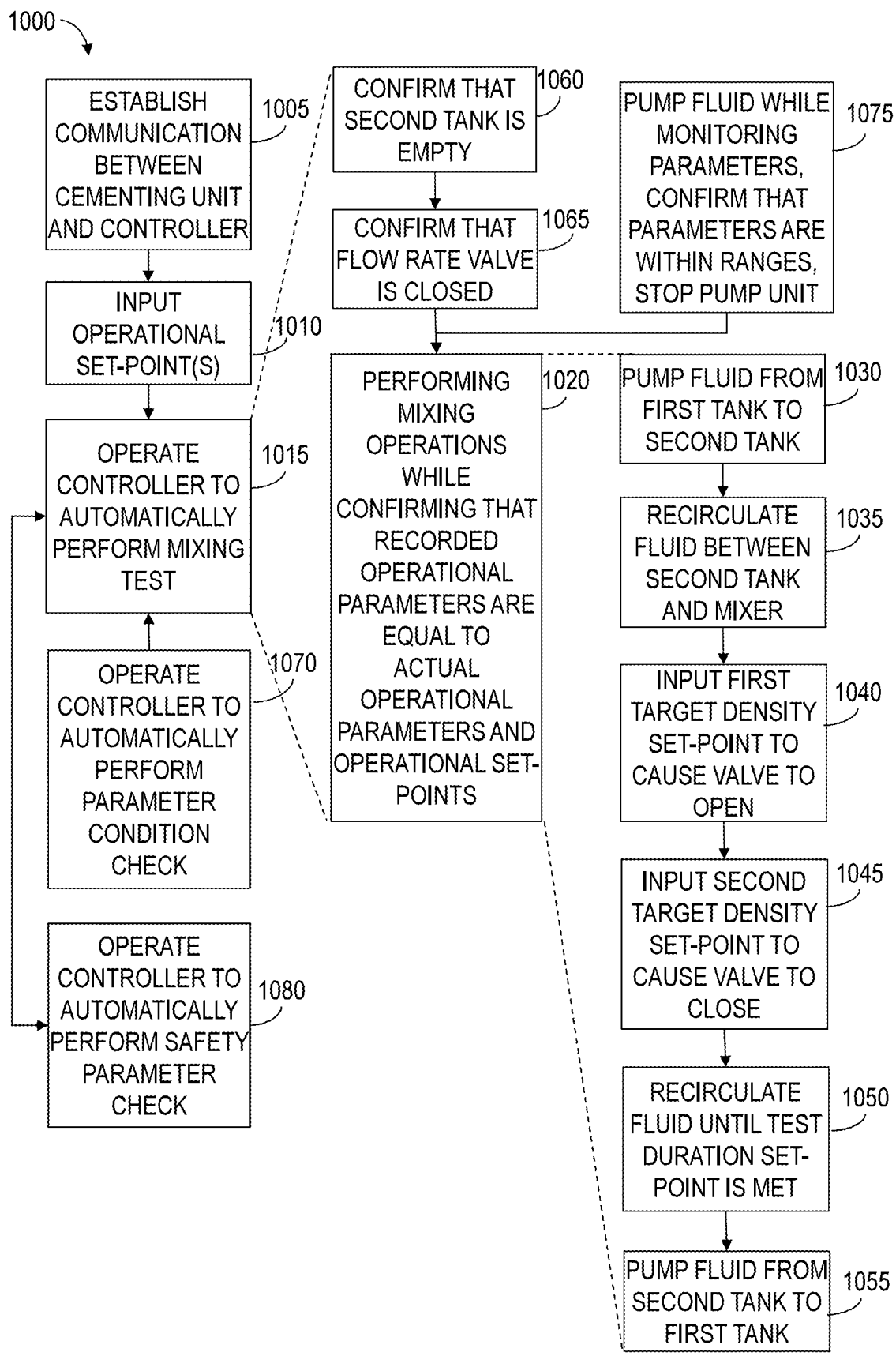
FIG. 11 is a flow-chart diagram of at least a portion of an example implementation of a method according to one or more aspects of the present disclosure.

FIG. 11 is a flow-chart diagram of at least a portion of an example implementation of another method (1000) according to one or more aspects of the present disclosure. The method (1000) may be performed utilizing or otherwise in conjunction with at least a portion of one or more implementations of one or more instances of the apparatus shown in one or more of FIGS. 1-5 and/or otherwise within the scope of the present disclosure. For example, the method (1000) may be performed and/or caused, at least partially, by the controller 410 executing the coded instructions 432 according to one or more aspects of the present disclosure. Thus, the following description of the method (1000) also refers to apparatus shown in one or more of FIGS. 1-5. However, the method (1000) may also be performed in conjunction with implementations of apparatus other than those depicted in FIGS. 1-5 that are also within the scope of the present disclosure.

The method (1000) may comprise establishing (1005) communication between the cementing unit 200 and the controller 410. As described above, the controller 410 may be operable to control operation of the cementing unit 200, such as via operation of the processor 412, the memory 417, and the computer program code 432, and the cementing unit 200 may comprise a plurality of sensors 208, 218, 276, 311, 307, 309, 211 operable to generate information indicative of operational parameters of the cementing unit 200. The method (1000) may further comprise inputting (1010) into the controller 410 operational set-point(s) of the cementing unit 200, such as may be utilized by the controller 410 to automatically perform a mixing test and/or other operation of the cementing unit 200. Such inputs (1010) may be performed by the human operator via the input devices 426 described above, although the controller 410 may also be operable to retrieve the inputs as predetermined values/ranges included in the computer program code 432.

The method (1000) may also comprise operating (1015) the controller 410 to automatically perform the mixing test of the cementing unit. The mixing test (1015) may comprise automatically performing (1020) a mixing operation while confirming that the sensed operational parameters are substantially equal to: corresponding actual values corresponding to the operational parameters and corresponding operational set-points.

The method (1000), wherein the operational set-points comprise a fluid volume set-point. Performing (1020) the mixing operations may comprise pumping (1030) fluid from a first tank 210, 212 to a second tank 222 while recording a first flow rate of the fluid and a volume of the fluid within the second tank 222 until the second tank fluid volume is substantially equal to the fluid volume set-point, and recirculating (1035) the fluid between the second tank 222 and a solid/liquid mixer 202 while recording a second flow rate and a density of the recirculated fluid. The mixing operations (1020) may further comprise inputting (1040) a first target density set-point to cause a cement flow rate control valve 205 associated with a cement source 204 to progressively open while recording first positions of the cement flow rate control valve 205, wherein the first target density set-point is greater than an initial density of the recirculated fluid, and inputting (1045) a second target density set-point to cause the cement flow rate control valve 205 to progressively close while recording second cement flow rate control valve positions, wherein the second target density set-point is less than the initial density of the recirculated fluid.

In an example implementation, the fluid volume set-point may range between about five barrels (BBL) and about fifteen BBL of fluid. The fluid utilized during the mixing test (1015) may be water, which may comprise a density of about 8.3 pounds per gallon (PPG). Accordingly, the first target density set-point may be greater than the density of water, while the second target density set-point may be less than the density of water. For example, the first target density set-point may be greater than about 9.0 PPG and the second target density set-point may be less than about 7.5 PPG. Although the cement flow rate control valve 205 may be opened and closed, the cement source 204 may not contain cement or other material to be combined with the recirculated fluid within the mixer 202.

Inputting (1010) the operational set-point(s) may further comprise inputting into the controller 410 a test duration set-point, wherein performing (1020) the mixing operations further comprises, after the flow rate control valve 205 is substantially closed, recirculating (1050) the fluid while recording a third flow rate and the current density of the recirculated fluid until the test duration set-point is met. The test duration set-point may range between about five minutes and about thirty minutes.

Performing (1020) the mixing operations may further comprise, after the test duration set-point is met (1050), pumping (1055) the fluid from the second tank 222 to the first tank 210, 212 while recording a fourth flow rate and the current density of the fluid until the fluid volume within the second tank 222 is substantially empty. For example, the fluid may be pumped from the second tank 222 to the first tank 210, 212 by utilizing one or more of the pumps 263, 265 to pump the fluid from the second tank 222, via the fluid conduit 215 and the fluid conduit 271, into fluid conduits 231, 232 to be received by one or more of the pumps 241, 242. Thereafter, the one or more of the pumps 241, 242 may pump the fluid though the fluid conduits 234, 235, 236, the choke valve 252, and the fluid conduit 254 into the first tank 210, 212.

Inputting (1010) the operational set-point(s) may further comprise inputting into the controller 410 a valve position set-point, wherein pumping (1030) the fluid from the first tank 210, 212 to the second tank 222 may comprise opening a fluid flow rate control valve 217, 219 fluidly connected between the first and second tanks 210, 212, 222 to the valve position set-point while recording positions of the fluid flow rate control valve 217, 219 until the second tank fluid volume is substantially equal to the fluid volume set-point, and then recording the current position of the fluid flow rate control valve 217, 219 and closing the fluid flow rate control valve 217, 219.

The valve position set-point may comprise an intended valve position for testing healthy proportional or incremental opening and/or closing of the fluid flow rate control valve 217, 219. For example, the valve position set-point may comprise 25%, 50%, or 75% of a fully-open flow position of the fluid flow rate control valve 217, 219.

The method (1000), wherein the fluid flow rate valve 217, 219 is a first fluid flow rate valve 219 and the valve position set-point is a first valve position set-point. Inputting (1010) the operational set-point(s) may also comprise inputting into the controller 410 a second valve position set-point. Pumping (1030) the fluid from the first tank 210, 212 to the second tank 222 may further comprise opening a second fluid flow rate control valve 217 fluidly connected between the first pump 220 and the solid/liquid mixer 202 to the second valve position set-point while recording a position of the second fluid flow rate control valve 217, until the second tank fluid volume is substantially equal to the fluid volume set-point, and then recording the current position of the second fluid flow rate control valve 217 and then closing the second fluid flow rate control valve 217.

The second valve position set-point may comprise an intended valve position for testing healthy proportional or incremental opening and/or closing of the second fluid flow rate control valve 217. For example, the valve position set-point may comprise 25%, 50%, or 75% of the fully-open flow position of the second fluid flow rate control valve 217.

The mixing test (1015) may further comprise, before performing (1020) the mixing operations, confirming (1060) that the second tank 222 is substantially empty, and confirming (1065) that the fluid flow rate control valve is in the fully-closed flow position.

The method (1000), wherein the second tank 222 comprises a first portion 255 in fluid connection with a second portion 257. Pumping (1030) the fluid from the first tank 210, 212 to the second tank 222 may comprise pumping the fluid from the first tank 210, 212 into the first and second portions 255, 257 of the second tank 222 while recording the volumes of the fluid within the first and second portions 255, 257 until the fluid volume within the second portion 257 is substantially equal to the fluid volume set-point.

The method (1000), wherein the fluid volume set-point is a first fluid volume set-point and the operational set-points further comprise a second fluid volume set-point. Performing the mixing operations (1020) may further comprise, before pumping the fluid from the first tank 210, 212 to the second tank 222, introducing the fluid into the first tank 210, 212 while recording volume of the fluid within the first tank 210, 212 until the volume of the fluid within the first tank is substantially equal to the second fluid volume set-point. In an example implementation, the second fluid volume set-point may range between about ten BBL and about twenty BBL of fluid.

The method (1000) may further comprise, before operating (1015) the controller 410 to perform the mixing test, operating (1070) the controller 410 to automatically perform a parameter condition check of the cementing unit 200. The parameter condition check (1070) may be performed similarly to the parameter condition check (565) described above.

The mixing test (1015) may further comprise, before performing (1020) the mixing operations, pumping (1075) the fluid with the pump 300 while monitoring the pumping speed, fluid pressure, and fluid flow rate generated by the pump 300, confirming that the monitored pumping speed, fluid pressure, and fluid flow rate are within corresponding predetermined ranges, and decreasing the pumping speed until the pump 300 stops pumping the fluid.

The method (1000) may further comprise operating (1080) the controller 410 to automatically perform a safety parameter check of the cementing unit 200, comprising monitoring safety parameters based on the information generated by the sensors 307, 309, 311, 317 and confirming the safety parameters are within corresponding predetermined ranges. The safety parameter check (1080) may be performed similarly to the safety parameter check (575) described above. The safety parameter check (870) may be performed before, during, and/or after the over mixing test (1015), the confirmation (1060, 1065) operations, the parameter condition check (1070), the pumping (1075) operation, and/or other operations of the cementing unit 200.

Figure 12:
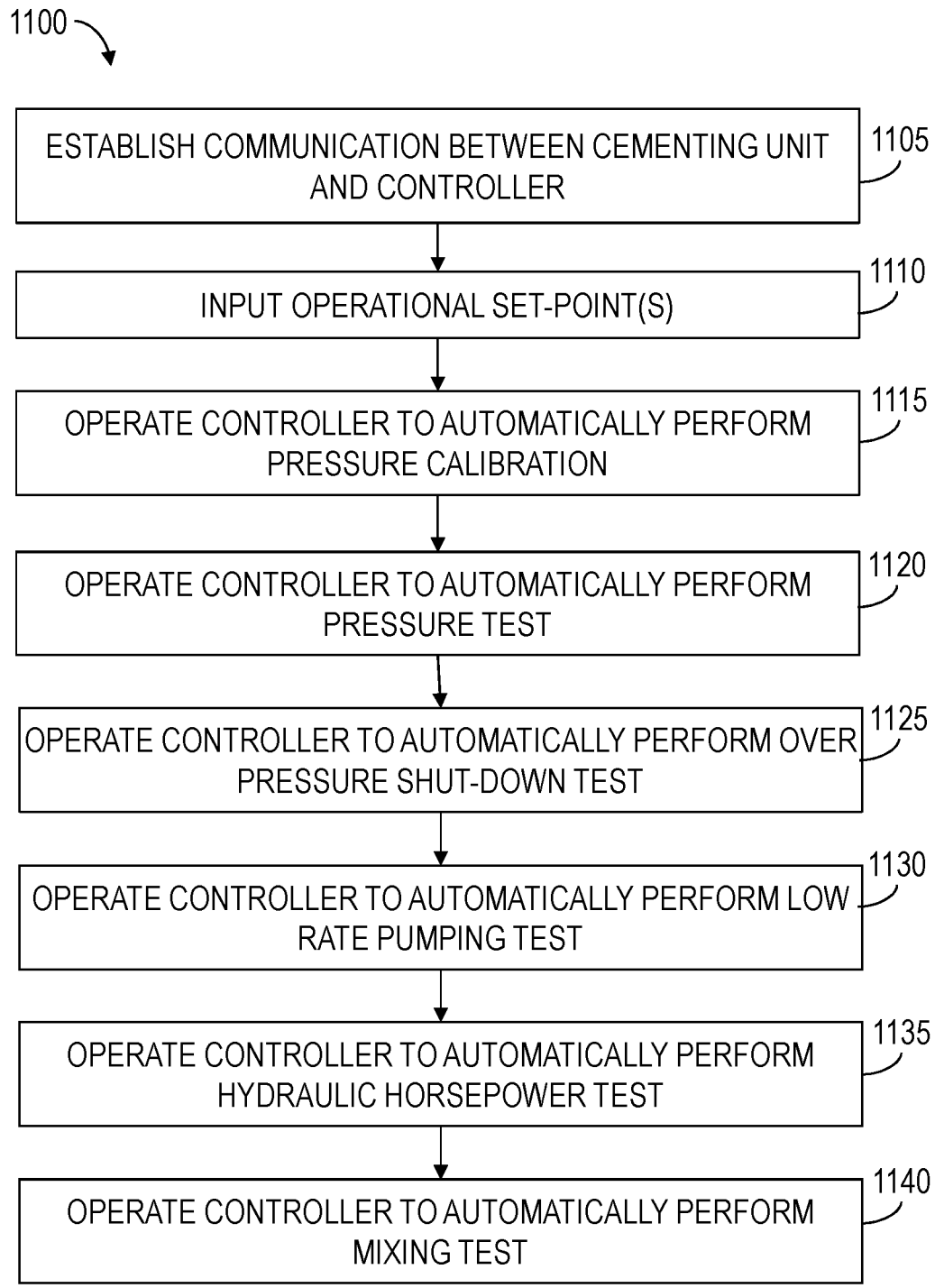
FIG. 12 is a flow-chart diagram of at least a portion of an example implementation of a method according to one or more aspects of the present disclosure.

FIG. 12 is a flow-chart diagram of at least a portion of an example implementation of another method (1100) according to one or more aspects of the present disclosure. The method (1100) may be performed utilizing or otherwise in conjunction with at least a portion of one or more implementations of one or more instances of the apparatus shown in one or more of FIGS. 1-5 and the methods shown in one or more of FIGS. 6-11, and/or otherwise within the scope of the present disclosure. For example, the method (1100) may be performed and/or caused, at least partially, by the controller 410 executing the coded instructions 432 according to one or more aspects of the present disclosure. Thus, the following description of the method (1100) also refers to apparatus shown in one or more of FIGS. 1-5 and the methods shown in one or more of FIGS. 6-11. However, the method (1100) may also be performed in conjunction with implementations of apparatus and methods other than those depicted in FIGS. 1-11 that are also within the scope of the present disclosure.

The method (1100) may comprise establishing (1105) communication between the cementing unit 200 and the controller 410 having one or more aspects of or substantially similar to the method (1050) shown in FIG. 11. As described above, the controller 410 may be operable to control operation of the cementing unit 200, such as via operation of the processor 412, the memory 417, and the computer program code 432, and the cementing unit 200 may comprise a plurality of sensors 208, 218, 276, 311, 307, 309, 211 operable to generate information indicative of operational parameters of the cementing unit 200. The method (1100) may further comprise inputting (1110) into the controller 410 operational set-point(s) of the cementing unit 200, such as may be utilized by the controller 410 to automatically perform one or more methods shown in FIGS. 6-11 and/or other operations of the cementing unit 200. Such inputs (1110) may be performed by the human operator via the input devices 426 described above, although the controller 410 may also be operable to retrieve the inputs as predetermined values/ranges included in the computer program code 432.

The method (1100) may also comprise at least a portion of at least two of the method (500) shown in FIG. 6, the method (600) shown in FIG. 7, the method (700) shown in FIG. 8, the method (800) shown in FIG. 9, the method (900) shown in FIG. 10, and the method (1000) shown in FIG. 11. For example, the method (1100) may comprise operating (1115) the controller 410 to automatically perform a pressure calibration of the cementing unit 200 having one or more aspects of or substantially similar to the method (500) shown in FIG. 6. The method (1100) may also or instead comprise operating (1120) the controller 410 to automatically perform a pressure test of the cementing unit 200 having one or more aspects of or substantially similar to the method (600) shown in FIG. 7. The method (1100) may also or instead comprise operating (1125) the controller 410 to automatically perform an over pressure shut-down test of the cementing unit 200 having one or more aspects of or substantially similar to the method (700) shown in FIG. 8. The method (1100) may also or instead comprise operating (1130) the controller 410 to automatically perform a low rate pumping test of the cementing unit 200 having one or more aspects of or substantially similar to the method (800) shown in FIG. 9. The method (1100) may also or instead comprise operating (1135) the controller 410 to automatically perform a hydraulic horsepower test of the cementing unit 200 having one or more aspects of or substantially similar to the method (900) shown in FIG. 10. The method (1100) may also or instead comprise operating (1140) the controller 410 to automatically perform a mixing test of the cementing unit 200 having one or more aspects of or substantially similar to the method (1000) shown in FIG. 11.

In view of the entirety of the present disclosure, including the claims and the figures, a person having ordinary skill in the art will readily recognize that the present disclosure introduces a method comprising: (A) establishing communication between a cementing unit and a controller operable to control operation of the cementing unit, wherein the controller comprises a processor and a memory including computer program code; (B) inputting a pressure set-point; and (C) operating the controller to automatically perform a pressure calibration of the cementing unit, wherein the pressure calibration comprises automatically: (1) varying a pumping speed of a pump unit of the cementing unit to increase a fluid pressure generated by the pump unit to the pressure set-point while recording the varying pumping speeds and corresponding fluid pressures; and (2) determining a pressure ramp relating the recorded pumping speeds and corresponding fluid pressures.

The pressure set-point may be a first pressure set-point, the recorded pumping speeds may be recorded first pumping speeds, the recorded fluid pressures may be recorded first fluid pressures, the method may further comprise inputting a second pressure set-point, and the pressure calibration may further comprise, after determining the pressure ramp, progressively opening a choke valve of the cementing unit downstream of the pump unit while recording positions of the choke valve and corresponding second fluid pressures until one of the recorded second fluid pressures substantially equals the second pressure set-point. The pressure ramp may be a first pressure ramp, and the pressure calibration may further comprise determining a second pressure ramp relating the recorded second fluid pressures and corresponding choke valve positions. The method may further comprise inputting an incremental position set-point, and progressively opening the choke valve may be via the incremental position set-point.

Varying the pumping speed may comprise: progressively increasing the pumping speed to a first speed; and progressively decreasing the pumping speed from the first speed to a second speed that is substantially zero. The fluid pressure may reach the pressure set-point while the pumping speed is increasing or decreasing. The method may further comprise inputting first and second incremental speed set-points, wherein progressively increasing the pumping speed may be via the first incremental speed set-point, and wherein progressively decreasing the pumping speed may be via the second incremental speed set-point. The pressure ramp may be a first pressure ramp, the recorded pumping speeds may be recorded first pumping speeds, the recorded fluid pressures may be recorded first fluid pressures, and the method may further comprise inputting a second pressure set-point, a first incremental percentage set-point that is a percentage of the second pressure set-point, and a second incremental percentage set-point that is a percentage of the second pressure set-point. In such implementations, the pressure calibration may further comprise varying the pumping speed to increase the fluid pressure to the second pressure set-point while recording second pumping speeds and corresponding second fluid pressures. Varying the pumping speed to increase the fluid pressure to the second pressure set-point may comprise: progressively increasing the pumping speed by a first amount that corresponds to the first incremental percentage set-point and that is based on the first pressure ramp; and progressively decreasing the pumping speed by a second amount that corresponds to the second incremental percentage set-point and that is based on the first pressure ramp until the pumping speed is zero. The pressure calibration may further comprise determining a second pressure ramp relating the recorded second pumping speeds and second fluid pressures.

The pressure calibration may further comprise, before varying the pumping speed: confirming that the pump unit is not pumping fluid; confirming that the pump unit is depressurized; and confirming that a choke valve of the cementing unit downstream of the pump unit is closed.

The cementing unit may comprise a plurality of sensors operable to generate information indicative of operational parameters of the cementing unit, including the recorded pumping speeds and fluid pressures. The method may further comprise, before operating the controller to automatically perform the pressure calibration, operating the controller to automatically perform a parameter condition check of the cementing unit, wherein the parameter condition check comprises automatically: monitoring ones of the operational parameters indicative of the cementing unit operational status based on the information generated by the sensors; and confirming the monitored ones of the operational parameters are within corresponding predetermined ranges. The monitored ones of the operational parameters may be indicative of at least one of: a temperature of the pump unit; presence of moisture in association with the pump unit; a pressure of a cooling system of the pump unit; and a pressure of a lubrication system of the pump unit.

The pressure calibration may further comprise, before varying the pumping speed: pumping fluid with the pump unit while monitoring the pumping speed, the fluid pressure, and a fluid flow rate generated by the pump unit; confirming that the monitored pumping speed, fluid pressure, and fluid flow rate are within corresponding predetermined ranges; and progressively decreasing the pumping speed until the pump unit stops pumping fluid.

The cementing unit may comprise a plurality of sensors operable to generate information indicative of operational parameters of the cementing unit, including the recorded pumping speeds and fluid pressures. The method may further comprise operating the controller to automatically perform a safety parameter check of the cementing unit, wherein performing the safety parameter check comprises automatically: monitoring safety parameters based on the information generated by the sensors; and confirming the safety parameters are within corresponding predetermined ranges.

The present disclosure also introduces a method comprising: (A) establishing communication between a cementing unit and a controller operable to control operation of the cementing unit, wherein the controller comprises a processor and a memory including computer program code; (B) inputting a pressure set-point and a test duration set-point; and (C) operating the controller to automatically perform a pressure test of the cementing unit, wherein the pressure test comprises automatically: (1) varying a pumping speed of a pump unit of the cementing unit to increase a fluid pressure generated by the pump unit to the pressure set-point while recording the varying pumping speeds and corresponding first fluid pressures, wherein the recorded first fluid pressures are detected within a fluid conduit of the cementing unit downstream of the pump unit; and (2) recording second fluid pressures within the fluid conduit until the test duration set-point is met while confirming that the recorded second fluid pressures are within a predetermined range of the pressure set-point.

The pressure set-point may be a first pressure set-point, the method may further comprise inputting a second pressure set-point, and the pressure test may further comprise, after the duration set-point is met, progressively opening a choke valve of the cementing unit downstream of the pump unit while recording third fluid pressures within the fluid conduit until one of the recorded third fluid pressures is substantially equal to the second pressure set-point. The method may further comprise inputting an incremental position set-point, wherein progressively opening the choke valve may be via the incremental position set-point. The method may further comprise inputting an incremental percentage set-point of a fully-open position of the choke valve, wherein progressively opening the choke valve may be via the incremental percentage set-point.

The pressure set-point may be a first pressure set-point, the recorded pumping speeds may be recorded first pumping speeds, the test duration set-point may be a first test duration set-point, the predetermined range may be a first predetermined range, the method may further comprise inputting a second pressure set-point and a second test duration set-point, and the pressure test may further comprise, after the first test duration set-point is met: varying the pumping speed to increase the fluid pressure to the second pressure set-point while recording second pumping speeds and corresponding third fluid pressures; and recording fourth fluid pressures until the second test duration set-point is met while confirming that the recorded fourth fluid pressures are within a second predetermined range of the second pressure set-point.

Varying the pumping speed may comprise: progressively increasing the pumping speed to a first speed; and progressively decreasing the pumping speed from the first speed to a second speed that is substantially zero. The method may further comprise inputting first and second incremental speed set-points, wherein progressively increasing the pumping speed may be via the first incremental speed set-point, and wherein progressively decreasing the pumping speed may be via the second incremental speed set-point. The method may further comprise inputting first and second incremental percentage set-points that are corresponding percentages of the pressure set-point, wherein progressively increasing the pumping speed may be based on the first incremental percentage set-point, and wherein progressively decreasing the pumping speed may be based on the second incremental percentage set-point.

The pressure test may further comprise, before varying the pumping speed: confirming that the pump unit is not pumping fluid; confirming that the pump unit is depressurized; and confirming that a choke valve of the cementing unit downstream of the pump unit is closed.

The cementing unit may comprise a plurality of sensors operable to generate information indicative of operational parameters of the cementing unit, including the recorded pumping speeds and fluid pressures. The method may further comprise, before operating the controller to automatically perform the pressure test, operating the controller to automatically perform a parameter condition check of the cementing unit, wherein the parameter condition check comprises automatically: monitoring ones of the operational parameters indicative of the cementing unit operational status based on the information generated by the sensors; and confirming the monitored ones of the operational parameters are within corresponding predetermined ranges. The monitored ones of the operational parameters may be indicative of at least one of: a temperature of the pump unit; presence of moisture in association with the pump unit; a pressure of a cooling system of the pump unit; and a pressure of a lubrication system of the pump unit.

The pressure calibration may further comprise, before varying the pumping speed: pumping fluid with the pump unit while monitoring the pumping speed, the fluid pressure, and a fluid flow rate generated by the pump unit; confirming that the monitored pumping speed, fluid pressure, and fluid flow rate are within corresponding predetermined ranges; and progressively decreasing the pumping speed until the pump unit stops pumping fluid.

The cementing unit may comprise a plurality of sensors operable to generate information indicative of operational parameters of the cementing unit, including the recorded pumping speeds and fluid pressures. The method may further comprise operating the controller to automatically perform a safety parameter check of the cementing unit, wherein performing the safety parameter check comprises automatically: monitoring safety parameters based on the information generated by the sensors; and confirming the safety parameters are within corresponding predetermined ranges.

The present disclosure also introduces a method comprising: (A) establishing communication between a cementing unit and a controller operable to control operation of the cementing unit, wherein the controller comprises a processor and a memory including computer program code; (B) inputting a pumping speed set-point and a pressure set-point; and (C) operating the controller to automatically perform an over-pressure shut-down test of the cementing unit, wherein the over-pressure shut-down test comprises automatically: (1) while a choke valve of the cementing unit downstream of a pump unit of the cementing unit is at least partially open, progressively increasing a pumping speed of the pump unit while recording the varying pumping speeds and corresponding first fluid pressures until one of the recorded pumping speeds substantially equals the pumping speed set-point; then (2) progressively closing the choke valve while recording positions of the choke valve and corresponding second fluid pressures at least until the pump unit automatically stops pumping in response to over-pressurization; and then (3) confirming that one of the recorded second fluid pressures associated with the automatic pump unit stoppage is within a predetermined range of the pressure set-point.

The recorded choke valve positions may be recorded first choke valve positions, and the over-pressure shut-down test may further comprise, after progressively closing the choke valve, progressively opening the choke valve while recording second choke valve positions and corresponding third fluid pressures until the choke valve is in a fully-open position.

The method may further comprise inputting an incremental speed set-point, wherein progressively increasing the pumping speed may be via the incremental speed set-point.

The method may further comprise inputting an incremental position set-point, wherein progressively closing the choke valve may be via the incremental position set-point.

The over-pressure shut-down test may further comprise, before progressively increasing the pumping speed: confirming that the pump unit is not pumping the fluid; confirming that the pump unit is depressurized; and confirming that the choke valve is open.

The cementing unit may comprise a plurality of sensors operable to generate information indicative of operational parameters of the cementing unit, including the recorded pumping speeds and fluid pressures. The method may further comprise, before operating the controller to automatically perform the pressure test, operating the controller to automatically perform a parameter condition check of the cementing unit, wherein the parameter condition check comprises automatically: monitoring ones of the operational parameters indicative of the cementing unit operational status based on the information generated by the sensors; and confirming the monitored ones of the operational parameters are within corresponding predetermined ranges. The monitored ones of the operational parameters may be indicative of at least one of: a temperature of the pump unit; presence of moisture in association with the pump unit; a pressure of a cooling system of the pump unit; and a pressure of a lubrication system of the pump unit.

The over-pressure shut-down test may further comprise, before varying the pumping speed: pumping fluid with the pump unit while monitoring the pumping speed, the fluid pressure, and a fluid flow rate generated by the pump unit; confirming that the monitored pumping speed, fluid pressure, and fluid flow rate are within corresponding predetermined ranges; and progressively decreasing the pumping speed until the pump unit stops pumping fluid.

The cementing unit may comprise a plurality of sensors operable to generate information indicative of operational parameters of the cementing unit, including the recorded pumping speeds and fluid pressures. The method may further comprise operating the controller to automatically perform a safety parameter check of the cementing unit, wherein performing the safety parameter check comprises automatically: monitoring safety parameters based on the information generated by the sensors; and confirming the safety parameters are within corresponding predetermined ranges.

The present disclosure also introduces a method comprising: (A) establishing communication between a cementing unit and a controller operable to control operation of the cementing unit, wherein the controller comprises a processor and a memory including computer program code; (B) inputting a first pumping speed set-point, a second pumping speed set-point, and a flow rate set-point, wherein the second pumping speed set-point is at least 10% of the first pumping speed set-point; and (C) operating the controller to automatically perform a low rate pumping test of the cementing unit, wherein the low rate pumping test comprises automatically: (1) progressively increasing pumping speed of a pump unit of the cementing unit while recording first pumping speeds and corresponding first fluid flow rates generated by the pump unit until one of the recorded first pumping speeds substantially equals the first pumping speed set-point; (2) progressively decreasing the pumping speed from the first pumping speed set-point while recording second pumping speeds and corresponding second fluid flow rates until one of the recorded second pumping speeds substantially equals the second pumping speed set-point; and (3) confirming that one of the recorded second fluid flow rates corresponding to the one of the recorded second pumping speeds is within a predetermined range of the flow rate set-point.

The low rate pumping test may further comprise: recording first fluid pressures corresponding to the recorded first pumping speeds while progressively increasing the pumping speed; and recording second fluid pressures corresponding to the recorded second pumping speeds while progressively decreasing the pumping speed.

The method may further comprise inputting a pressure set-point and a test duration set-point, and the low rate pumping test may further comprise: progressively closing a choke valve of the cementing unit downstream of the pump unit while recording positions of the choke valve and corresponding first fluid pressures and third fluid flow rates generated by the pump unit until one of the recorded first fluid pressures is substantially equal to the pressure set-point; and then recording second fluid pressures and corresponding fourth fluid flow rates until the test duration set-point is met while confirming that the recorded second fluid pressures and fourth fluid flow rates are within predetermined corresponding ranges of the pressure set-point and the flow rate set-point.

The low rate pumping test may further comprise, before progressively increasing the pumping speed: confirming that the pump unit is not pumping fluid; confirming that the pump unit is depressurized; and confirming that a choke valve of the cementing unit downstream of the pump unit is open.

The cementing unit may comprise a plurality of sensors operable to generate information indicative of operational parameters of the cementing unit, including the recorded pumping speeds and fluid pressures. The method may further comprise, before operating the controller to automatically perform the pressure test, operating the controller to automatically perform a parameter condition check of the cementing unit, wherein the parameter condition check comprises automatically: monitoring ones of the operational parameters indicative of the cementing unit operational status based on the information generated by the sensors; and confirming the monitored ones of the operational parameters are within corresponding predetermined ranges. The monitored ones of the operational parameters may be indicative of at least one of: a temperature of the pump unit; presence of moisture in association with the pump unit; a pressure of a cooling system of the pump unit; and a pressure of a lubrication system of the pump unit.

The low rate pumping test may further comprise, before varying the pumping speed: pumping fluid with the pump unit while monitoring the pumping speed, the fluid pressure, and a fluid flow rate generated by the pump unit; confirming that the monitored pumping speed, fluid pressure, and fluid flow rate are within corresponding predetermined ranges; and progressively decreasing the pumping speed until the pump unit stops pumping fluid.

The cementing unit may comprise a plurality of sensors operable to generate information indicative of operational parameters of the cementing unit, including the recorded pumping speeds and fluid pressures. The method may further comprise operating the controller to automatically perform a safety parameter check of the cementing unit, wherein performing the safety parameter check comprises automatically: monitoring safety parameters based on the information generated by the sensors; and confirming the safety parameters are within corresponding predetermined ranges.

The present disclosure also introduces a method comprising: (A) establishing communication between a cementing unit and a controller operable to control operation of the cementing unit, wherein the controller comprises a processor and a memory including computer program code, and wherein the cementing unit comprises a plurality of sensors operable to generate information indicative of operational parameters of the cementing unit; (B) inputting operational set-points of the cementing unit; and (C) operating the controller to automatically perform a mixing test of the cementing unit, wherein the mixing test comprises automatically performing a mixing operation while confirming that the sensed operational parameters are substantially equal to corresponding: actual values corresponding to the operational parameters; and operational set-points.

The operational set-points may comprise a fluid volume set-point, and performing the mixing operation may comprise: pumping fluid from a first tank to a second tank while recording a first flow rate of the fluid and a volume of the fluid within the second tank until the second tank fluid volume is substantially equal to the fluid volume set-point; recirculating the fluid between the second tank and a solid/liquid mixer while recording a second flow rate and a density of the recirculated fluid; inputting a first target density set-point to cause a cement flow rate control valve associated with a cement source to progressively open while recording first positions of the cement flow rate control valve, wherein the first target density set-point is greater than an initial density of the recirculated fluid; and inputting a second target density set-point to cause the cement flow rate control valve to progressively close while recording second cement flow rate control valve positions, wherein the second target density set-point is less than the initial density of the recirculated fluid. The operational set-points may further comprise a test duration set-point, and performing the mixing operation may further comprise, after the flow rate control valve is substantially closed, recirculating the fluid while recording a third flow rate and the current density of the recirculated fluid until the test duration set-point is met. Performing the mixing operation may further comprise, after the test duration set-point is met, pumping the fluid from the second tank to the first tank while recording a fourth flow rate and the current density of the fluid until the second tank is substantially empty.

The operational set-points may further comprise a valve position set-point, and pumping the fluid from the first tank to the second tank may comprise: opening a fluid flow rate control valve fluidly connected between the first and second tanks to the valve position set-point while recording positions of the fluid flow rate control valve until the second tank fluid volume is substantially equal to the fluid volume set-point; and then recording the current position of the fluid flow rate control valve and then closing the fluid flow rate control valve. The fluid flow rate valve may be a first fluid flow rate valve and the valve position set-point may be a first valve position set-point, the operational set-points may further comprise a second valve position set-point, and pumping the fluid from the first tank to the second tank may further comprise: opening a second fluid flow rate control valve fluidly connected between the first pump and the solid/liquid mixer to the second valve position set-point, while recording a position of the second fluid flow rate control valve, until the second tank fluid volume is substantially equal to the fluid volume set-point; and then recording the current position of the second fluid flow rate control valve and then closing the second fluid flow rate control valve. The method may further comprise, before performing the mixing operation: confirming that the second tank is substantially empty; and confirming that the fluid flow rate control valve is closed.

The second tank may comprise a first portion in fluid connection with a second portion, wherein pumping the fluid from the first tank to the second tank may comprise pumping the fluid from the first tank into the first and second portions of the second tank while recording the volumes of the fluid within the first and second portions until the fluid volume within the second portion is substantially equal to the fluid volume set-point.

The fluid volume set-point may be a first fluid volume set-point, the operational set-points may further comprise a second fluid volume set-point, and performing the mixing operation may further comprise, before pumping the fluid from the first tank to the second tank, introducing the fluid into the first tank while recording volume of the fluid within the first tank until the volume of the fluid within the first tank is substantially equal to the second fluid volume set-point.

The cementing unit may comprise a plurality of sensors operable to generate information indicative of operational parameters of the cementing unit, including the recorded pumping speeds and fluid pressures. The method may further comprise, before operating the controller to automatically perform the pressure test, operating the controller to automatically perform a parameter condition check of the cementing unit, wherein the parameter condition check comprises automatically: monitoring ones of the operational parameters indicative of the cementing unit operational status based on the information generated by the sensors; and confirming the monitored ones of the operational parameters are within corresponding predetermined ranges. The monitored ones of the operational parameters may be indicative of at least one of: a temperature of the pump unit; presence of moisture in association with the pump unit; a pressure of a cooling system of the pump unit; and a pressure of a lubrication system of the pump unit.

The mixing test may further comprise, before varying the pumping speed: pumping fluid with the pump unit while monitoring the pumping speed, the fluid pressure, and a fluid flow rate generated by the pump unit; confirming that the monitored pumping speed, fluid pressure, and fluid flow rate are within corresponding predetermined ranges; and progressively decreasing the pumping speed until the pump unit stops pumping fluid.

The cementing unit may comprise a plurality of sensors operable to generate information indicative of operational parameters of the cementing unit, including the recorded pumping speeds and fluid pressures. The method may further comprise operating the controller to automatically perform a safety parameter check of the cementing unit, wherein performing the safety parameter check comprises automatically: monitoring safety parameters based on the information generated by the sensors; and confirming the safety parameters are within corresponding predetermined ranges.

The present disclosure also introduces a method comprising: (A) establishing communication between a cementing unit and a controller operable to control operation of the cementing unit, wherein the controller comprises a processor and a memory including computer program code; (B) inputting a torque output set-point, a horsepower set-point, and a pumping speed set-point; and (C) operating the controller to automatically perform a hydraulic horsepower test of the cementing unit, wherein the hydraulic horsepower test comprises automatically: (1) operating a pump unit of the cementing unit at the torque output set-point to increase pumping speed of the pump unit while recording first pumping speeds and corresponding first fluid pressures and first fluid flow rates generated by the pump unit until one of the recorded first pumping speeds substantially equals the pumping speed set-point; and then (2) progressively closing a choke valve of the cementing unit downstream of the pump unit to increase the fluid pressure generated by the pump unit while recording: (a) second pumping speeds and corresponding second fluid pressures and second fluid flow rates; and (b) hydraulic horsepower values of the pump unit based on the recorded second fluid pressures and second fluid flow rates, wherein closing the choke valve is performed until: (i) one of the recorded hydraulic horsepower values substantially equals the horsepower set-point; or (ii) one of the recorded second pumping speeds is less than the pumping speed set-point by a predetermined amount.

The method may further comprise inputting a test duration set-point, a pressure set-point, and a flow rate set-point, wherein the hydraulic horsepower test may further comprise, after stopping further closure of the choke valve, recording third fluid pressures and third fluid flow rates until the test duration set-point is met while confirming that the recorded third fluid pressures and third fluid flow rates do not decrease more than corresponding predetermined amounts from the pressure set-point and flow rate set-point, respectively.

The hydraulic horsepower test may further comprise, after stopping further closure of the choke valve: decreasing the pumping speed to substantially zero; and then fully opening the choke valve. The torque output set-point may be a first torque output set-point, the pumping speed set-point may be a first pumping speed set-point, the hydraulic horsepower values may be first hydraulic horsepower values, and the method may further comprise inputting a second torque output set-point substantially greater than the first torque output set-point and a second pumping speed set-point substantially less than the first pumping speed set-point. The hydraulic horsepower test may further comprise, after fully opening the choke valve: (1) operating the pump unit at the second torque output set-point to increase the pumping speed while recording third pumping speeds and corresponding third fluid pressures and third fluid flow rates until one of the recorded third pumping speeds substantially equals the second pumping speed set-point; then (2) progressively closing the choke valve to increase the fluid pressure generated by the pump unit while recording: (a) fourth pumping speeds and corresponding fourth fluid pressures and fourth fluid flow rates; and (b) second hydraulic horsepower values based on the recorded fourth fluid pressures and fourth fluid flow rates, wherein closing the choke valve is performed until: (i) one of the recorded second hydraulic horsepower values substantially equals the horsepower set-point; or (ii) one of the recorded fourth pumping speeds is less than the second pumping speed set-point by a predetermined amount.

The hydraulic horsepower test may comprise, before operating the pump unit at the torque output set-point to increase the pumping speed: confirming that the pump unit is not pumping fluid; confirming that the pump unit is depressurized; and confirming that the choke valve is fully-open.

The cementing unit may comprise a plurality of sensors operable to generate information indicative of operational parameters of the cementing unit, including the recorded pumping speeds and fluid pressures. The method may further comprise, before operating the controller to automatically perform the pressure test, operating the controller to automatically perform a parameter condition check of the cementing unit, wherein the parameter condition check comprises automatically: monitoring ones of the operational parameters indicative of the cementing unit operational status based on the information generated by the sensors; and confirming the monitored ones of the operational parameters are within corresponding predetermined ranges. The monitored ones of the operational parameters may be indicative of at least one of: a temperature of the pump unit; presence of moisture in association with the pump unit; a pressure of a cooling system of the pump unit; and a pressure of a lubrication system of the pump unit.

The hydraulic horsepower test may further comprise, before varying the pumping speed: pumping fluid with the pump unit while monitoring the pumping speed, the fluid pressure, and a fluid flow rate generated by the pump unit; confirming that the monitored pumping speed, fluid pressure, and fluid flow rate are within corresponding predetermined ranges; and progressively decreasing the pumping speed until the pump unit stops pumping fluid.

The cementing unit may comprise a plurality of sensors operable to generate information indicative of operational parameters of the cementing unit, including the recorded pumping speeds and fluid pressures. The method may further comprise operating the controller to automatically perform a safety parameter check of the cementing unit, wherein performing the safety parameter check comprises automatically: monitoring safety parameters based on the information generated by the sensors; and confirming the safety parameters are within corresponding predetermined ranges.

The present disclosure also introduces apparatus operable to perform: the methods described above; one or more of such methods; one or more aspects of such methods; and/or other methods within the scope of the present disclosure.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:

1. A method comprising:
    establishing communication between a cementing unit and a controller operable to control operation of the cementing unit, wherein the controller comprises a processor and a memory including computer program code;
    inputting a pressure set-point; and
    operating the controller to automatically perform a pressure calibration of the cementing unit, wherein the pressure calibration comprises automatically:
        varying a pumping speed of a pump unit of the cementing unit to increase a fluid pressure generated by the pump unit to the pressure set-point while recording the varying pumping speeds and corresponding fluid pressures; and
        determining a pressure ramp relating the recorded pumping speeds and corresponding fluid pressures.

2. The method of claim 1 wherein:
    the pressure set-point is a first pressure set-point;
    the recorded pumping speeds are recorded first pumping speeds;
    the recorded fluid pressures are recorded first fluid pressures;
    the method further comprises inputting a second pressure set-point; and
    the pressure calibration further comprises, after determining the pressure ramp, progressively opening a choke valve of the cementing unit downstream of the pump unit while recording positions of the choke valve and corresponding second fluid pressures until one of the recorded second fluid pressures substantially equals the second pressure set-point.

3. The method of claim 2 wherein the pressure ramp is a first pressure ramp, and wherein the pressure calibration further comprises determining a second pressure ramp relating the recorded second fluid pressures and corresponding choke valve positions.

4. The method of claim 2 further comprising inputting an incremental position set-point, wherein progressively opening the choke valve is via the incremental position set-point.

5. The method of claim 1 wherein varying the pumping speed comprises:
    progressively increasing the pumping speed to a first speed; and
    progressively decreasing the pumping speed from the first speed to a second speed that is substantially zero.

6. The method of claim 5 further comprising inputting first and second incremental speed set-points, wherein progressively increasing the pumping speed is via the first incremental speed set-point, and wherein progressively decreasing the pumping speed is via the second incremental speed set-point.

7. The method of claim 5 wherein:
    the pressure ramp is a first pressure ramp;
    the recorded pumping speeds are recorded first pumping speeds;
    the recorded fluid pressures are recorded first fluid pressures;
    the method further comprises inputting a second pressure set-point, a first incremental percentage set-point that is a percentage of the second pressure set-point, and a second incremental percentage set-point that is a percentage of the second pressure set-point; and
    the pressure calibration further comprises:
        varying the pumping speed to increase the fluid pressure to the second pressure set-point while recording second pumping speeds and corresponding second fluid pressures, wherein varying the pumping speed to increase the fluid pressure to the second pressure set-point comprises:
            progressively increasing the pumping speed by a first amount that corresponds to the first incremental percentage set-point and that is based on the first pressure ramp; and
            progressively decreasing the pumping speed by a second amount that corresponds to the second incremental percentage set-point and that is based on the first pressure ramp until the pumping speed is zero; and determining a second pressure ramp relating the recorded second pumping speeds and second fluid pressures.

8. The method of claim 1 wherein the pressure calibration further comprises, before varying the pumping speed:
confirming that the pump unit is not pumping fluid;
confirming that the pump unit is depressurized; and
confirming that a choke valve of the cementing unit downstream of the pump unit is closed.

9. The method of claim 1 wherein:
the cementing unit comprises a plurality of sensors operable to generate information indicative of operational parameters of the cementing unit, including the recorded pumping speeds and fluid pressures; and
the method further comprises, before operating the controller to automatically perform the pressure calibration, operating the controller to automatically perform a parameter condition check of the cementing unit, wherein the parameter condition check comprises automatically:
monitoring ones of the operational parameters indicative of the cementing unit operational status based on the information generated by the sensors; and
confirming the monitored ones of the operational parameters are within corresponding predetermined ranges.

10. The method of claim 9 wherein the monitored ones of the operational parameters are indicative of at least one of:
a temperature of the pump unit;
presence of moisture in association with the pump unit;
a pressure of a cooling system of the pump unit; and
a pressure of a lubrication system of the pump unit.

11. The method of claim 1 wherein the pressure calibration further comprises, before varying the pumping speed:
pumping fluid with the pump unit while monitoring the pumping speed, the fluid pressure, and a fluid flow rate generated by the pump unit;
confirming that the monitored pumping speed, fluid pressure, and fluid flow rate are within corresponding predetermined ranges; and
progressively decreasing the pumping speed until the pump unit stops pumping fluid.

12. The method of claim 1 wherein:
the cementing unit comprises a plurality of sensors operable to generate information indicative of operational parameters of the cementing unit, including the recorded pumping speeds and fluid pressures; and
the method further comprises operating the controller to automatically perform a safety parameter check of the cementing unit, wherein performing the safety parameter check comprises automatically:
monitoring safety parameters based on the information generated by the sensors; and
confirming the safety parameters are within corresponding predetermined ranges.

13. A method comprising:
establishing communication between a cementing unit and a controller operable to control operation of the cementing unit, wherein the controller comprises a processor and a memory including computer program code;
inputting a pressure set-point and a test duration set-point; and operating the controller to automatically perform a pressure test of the cementing unit, wherein the pressure test comprises automatically:
varying a pumping speed of a pump unit of the cementing unit to increase a fluid pressure generated by the pump unit to the pressure set-point while recording the varying pumping speeds and corresponding first fluid pressures, wherein the recorded first fluid pressures are detected within a fluid conduit of the cementing unit downstream of the pump unit; and
recording second fluid pressures within the fluid conduit until the test duration set-point is met while confirming that the recorded second fluid pressures are within a predetermined range of the pressure set-point.

14. The method of claim 13 wherein:
the pressure set-point is a first pressure set-point;
the method further comprises inputting a second pressure set-point; and
the pressure test further comprises, after the duration set-point is met, progressively opening a choke valve of the cementing unit downstream of the pump unit while recording third fluid pressures within the fluid conduit until one of the recorded third fluid pressures is substantially equal to the second pressure set-point.

15. The method of claim 13 wherein:
the pressure set-point is a first pressure set-point;
the recorded pumping speeds are recorded first pumping speeds;
the test duration set-point is a first test duration set-point;
the predetermined range is a first predetermined range;
the method further comprises inputting a second pressure set-point and a second test duration set-point; and
the pressure test further comprises, after the first test duration set-point is met:
varying the pumping speed to increase the fluid pressure to the second pressure set-point while recording second pumping speeds and corresponding third fluid pressures; and
recording fourth fluid pressures until the second test duration set-point is met while confirming that the recorded fourth fluid pressures are within a second predetermined range of the second pressure set-point.

16. The method of claim 13 wherein varying the pumping speed comprises:
progressively increasing the pumping speed to a first speed; and
progressively decreasing the pumping speed from the first speed to a second speed that is substantially zero.

17. The method of claim 16 further comprising inputting first and second incremental speed set-points, wherein progressively increasing the pumping speed is via the first incremental speed set-point, and wherein progressively decreasing the pumping speed is via the second incremental speed set-point.

18. The method of claim 16 further comprising inputting first and second incremental percentage set-points that are corresponding percentages of the pressure set-point, wherein progressively increasing the pumping speed is based on the first incremental percentage set-point, and wherein progressively decreasing the pumping speed is based on the second incremental percentage set-point.

19. A method comprising:
establishing communication between a cementing unit and a controller operable to control operation of the cementing unit, wherein the controller comprises a processor and a memory including computer program code, and wherein the cementing unit comprises a plurality of sensors operable to generate information indicative of operational parameters of the cementing unit;

inputting operational set-points of the cementing unit; and operating the controller to automatically perform a mixing test of the cementing unit, wherein the mixing test comprises automatically performing a mixing operation while confirming that the sensed operational parameters are substantially equal to corresponding:

actual values corresponding to the operational parameters; and operational set-points.

20. The method of claim 19 wherein the operational set-points comprise a fluid volume set-point, and wherein performing the mixing operation comprises:

pumping fluid from a first tank to a second tank while recording a first flow rate of the fluid and a volume of the fluid within the second tank until the second tank fluid volume is substantially equal to the fluid volume set-point;

recirculating the fluid between the second tank and a solid/liquid mixer while recording a second flow rate and a density of the recirculated fluid;

inputting a first target density set-point to cause a cement flow rate control valve associated with a cement source to progressively open while recording first positions of the cement flow rate control valve, wherein the first target density set-point is greater than an initial density of the recirculated fluid; and inputting a second target density set-point to cause the cement flow rate control valve to progressively close while recording second cement flow rate control valve positions, wherein the second target density set-point is less than the initial density of the recirculated fluid.

* * * * *